United States Patent
Brown et al.

(10) Patent No.: US 7,634,595 B1
(45) Date of Patent: Dec. 15, 2009

(54) METHOD FOR SUSPENDING A DISCOVERY PROCESS, SAVING THE STATE OF THE DISCOVERY PROCESS, AND RESUMING THE DISCOVERY PROCESS DURING A DISTRIBUTED COPY OPERATION

(75) Inventors: David Joshua Brown, Chelmsford, MA (US); Michael Scharland, Franklin, MA (US); Patrick Brian Riordan, Watertown, MA (US); Kenneth A. Halligan, Leominster, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 422 days.

(21) Appl. No.: 11/014,597

(22) Filed: Dec. 16, 2004

(51) Int. Cl.
 *G06F 3/00* (2006.01)
 *G06F 5/00* (2006.01)
(52) U.S. Cl. ............................. 710/38; 710/17; 710/46; 710/47
(58) Field of Classification Search .................. 710/17, 710/38, 46, 47
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,671,776 B1 * | 12/2003 | DeKoning | 711/114 |
| 6,684,306 B1 * | 1/2004 | Nagasawa et al. | 711/162 |
| 6,697,367 B1 | 2/2004 | Halstead et al. | |
| 2002/0073358 A1 * | 6/2002 | Atkinson | 714/21 |
| 2005/0005038 A1 * | 1/2005 | Ayukawa et al. | 710/38 |
| 2006/0015643 A1 * | 1/2006 | Orava et al. | 709/238 |

* cited by examiner

*Primary Examiner*—Henry W. H. Tsai
*Assistant Examiner*—Kris Rhu
(74) *Attorney, Agent, or Firm*—Muirhead and Saturnelli, LLC

(57) ABSTRACT

Described is a distributed copying technique that may be used in migrating large amounts of data from one or more source devices to one or more destination devices. The data source is divided into partitions. As Fibre Channel adapters (FAs) become available, each of the FAs may copy a partition of the data. In connection with specifying paths used for the distributed copying technique, a preferred path selection (source port-target port mapping) may be made by executing code in a controlling data storage system to perform discovery processing. The preferred path selection is used for the duration of the distributed copying unless the preferred path is unable to transmit data. A target port of the preferred path may be randomly selected from all accessible target ports, and/or in accordance with a specified portion of the target ports. Preferred paths may also be specified using an API (application programming interface).

20 Claims, 25 Drawing Sheets

| Partition No. | Range |
|---|---|
| 1 | 1 .. LOC_X |
| 2 | LOC_X+1 .. LOC_Y |
| 3 | LOC_Y+1 .. LOC_Z |
| .. | .. |
| N-1 | .. |
| N | .. |

FIGURE 4

| DIRECTOR | INTERVAL | TIMESTAMP |
|---|---|---|
| 1 | | |
| 2 | | |
| 3 | | |
| .. .. | | |
| N-1 | | |
| N | | |

FIGURE 6

| DIRECTOR | COPY STATE |
|---|---|
| 1 | |
| 2 | |
| 3 | |
| .. .. | |
| N-1 | |
| N | |

FIGURE 7

METHOD FOR SUSPENDING A DISCOVERY PROCESS, SAVING THE STATE OF THE DISCOVERY PROCESS, AND RESUMING THE DISCOVERY PROCESS DURING A DISTRIBUTED COPY OPERATION

BACKGROUND

1. Technical Field

This application generally relates to a data storage system, and more particularly to techniques used with path selection such as when performing a remote data copying operation.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. One such task may include making a copy of data. At times, the amount of data to be copied may be a large amount from one or more devices. It may be desirable to have an efficient technique for copying the data in a distributed fashion. It may also be desirable to provide for such a copying technique which uses one or more processors as may be available, and which ensures that all the data is copied in the event of a failure of one or more of the processors. It may also be desirable to ensure that the processors copying data do not cause a performance bottleneck for the paths selected and used in connection with the copying.

SUMMARY OF THE INVENTION

In accordance with one aspect of the invention is a method for determining a path selection for data transmission from a source device of a source data storage system to a target device of a target data storage system comprising: selecting a source port servicing said source device in the source data storage system; and selecting a target port servicing said target device of said target data storage system, wherein said source port and said target port are used as a preferred source-target port pairing defining a preferred path used when transmitting data from said source device of said source data storage system to said target device of said target data storage system, at least one of said source port or said target port being determined using at least one of a preferred path mapping, or a designated group of ports. One of said preferred path mapping or said designated group of ports may be specified using an application executing on a host connected to at least one of the source data storage system or the target data storage system. The preferred path mapping may be specified using at least one of: a port-level designation or a director-level designation. The preferred path mapping may be specified using both a port-level designation and a director-level designation. The target port may be selected from said designated group of ports specifying one or more target ports of said target data storage system using at least one of a port-level designation or a director-level designation. The source port may be selected from said designated group of ports specifying one or more source ports of said source data storage system using at least one of a port-level designation or a director-level designation. The designated group of ports may specify a portion of all ports in at least one of said target data storage system or said source data storage system. If said preferred path mapping is specified using a director-level designation and said source data storage system is controlling said data transmission, the target port may be randomly selected from all ports servicing said target device which are included in said director-level designation and are accessible from said source port, and, wherein if a preferred target group is included in said designated group of ports, said target port is in accordance with said preferred target group. If said source data storage system controls said data transmission and either no preferred path mapping is specified or said preferred path mapping is not available for data transmissions, the target port may be randomly selected from ports which are accessible from said source port and which service said target device, and, wherein, if a preferred target group is included in said designated group of ports, said target port is in accordance with said preferred target group. If the preferred path mapping is specified using a director-level designation and said target data storage system is controlling said data transmission, the source port may be randomly selected from all ports servicing said source device which are included in said director-level designation and are accessible from said target port, and, wherein if a preferred source group is included in said designated group of ports, said source port is in accordance with said preferred source group. If the target data storage system controls said data transmission and either no preferred path mapping is specified or said preferred path mapping is not available for data transmissions, the source port may be randomly selecting said source port from ports which are accessible from said target port and which service said source device, and, wherein, if a preferred source group is included in said designated group of ports, said source port is in accordance with said preferred source group. The preferred source-target port pairing may define a preferred path used when copying data in connection with a distributed copying operation copying data from said source data storage system to said target data storage system, said preferred path being one of a plurality of paths used to copy said data, each of said plurality of paths copying a portion of said data at varying points in time. A source device of said source data storage system including data designated for copying in connection with said distributed copying technique may be accessible online by a host connected to said source data storage system while said distributed copying operation is being performed. The source-target port pairing may be determined by executing code on a processor of said source data storage system if said source data storage system is controlling a distributed copying operation copying data from said source data storage system to said target data storage system, the distributed copying operation may be performed in response to receiving a command from an application executing on a host connected to said source data storage system, and wherein the processor may be included in a director of said source data storage system, said source port being a port of said director. The preferred source-target port pairing may be determined by executing code on a processor of said target data storage system if said target data storage system is controlling a distributed copying operation copying data from said target data storage system to said source data storage system, the distributed copying operation may be performed in response to receiving a command from an application executing on a host connected to said target data storage system, and wherein the processor may be included in a director of said target data storage system, said target port being a port of said director. A host may issue a command to a controlling data storage system controlling a distributed copy operation, said controlling data storage system being one of said source or said target data storage systems, said command including path configuration information used in determining said preferred source-target port pairing. If said preferred path includes a port that is not available for data transmission, another preferred path may be determined using a random selection technique. The source port may be associated with a source device in the source data storage system and said target port may be associated with a target device in said target data storage system, and if said preferred path is not available for transmission and said source data storage system is controlling the data transmission, another target port associated with said target device is randomly select, and, if said target data storage system is controlling the data transmission, another source port associated with said source device is randomly selected.

In accordance with another aspect of the invention is a computer program product for determining a path selection for data transmission from a source device of a source data storage system to a target device of a target data storage system comprising code that: selects a source port servicing said source device in the source data storage system; and selects a target port servicing said target device of said target data storage system, wherein said source port and said target port are used as a preferred source-target port pairing defining a preferred path used when transmitting data from said source device of said source data storage system to said target device of said target data storage system, at least one of said source port or said target port being determined using at least one of a preferred path mapping, or a designated group of ports.

In accordance with another aspect of the invention is a method for determining a path selection for a data transmission from a source device of a source data storage system to a target device of a target data storage system comprising: specifying a plurality of preferred source-target pairings; selecting a first pairing from said plurality of preferred source-target pairings to use as a preferred pairing when transmitting data from said source device to said target device; and upon determining that said first pairing is not able to send data transmissions between said source device and said target device, selecting another pairing from said plurality of preferred source-target pairings, said plurality of preferred source-target pairings being a portion of possible source-target pairings available for use with said data transmission, wherein said plurality of preferred source-target pairings are included as a parameter in a call made from a host computer connected to at least one of said source data storage system and said target data storage system.

In accordance with another aspect of the invention is a method of processing operations in a data storage system comprising: receiving, by a director, a request from an entity connected to the data storage system; determining if said director is performing discovery processing associated with a distributed copy operation; and if said director is performing said discovery processing, suspending said discovery processing to perform said request, wherein said suspending includes saving discovery context information describing a state of said discovery processing, said discovery processing determining one or more paths in connection with said distributed copying operation. The method may also include resuming said discovery processing in accordance with said discovery context information. The discovery context information may include a representation of those paths discovered when said suspending occurs. The representation may be a tree structure that includes port-level discovery information. The tree may include 4 levels of nodes, a first level including a root node corresponding to a director, a second level including a node for each local port of said director, a third level including a node for each remote port accessible from one of said local ports, a fourth level including a node for each logical unit associated with a remote port having a node at said third level and a name associated with said each logical unit, and the tree may be constructed in a depth-first manner in accordance with performing said discovery processing. The discovery context information may include a descriptor representing a location in said tree structure at which said resuming attempts to continue with discovery processing. The method may also include, for said distributed copying operation, saving information regarding said one or more preferred paths, said one or more paths being used in data transmissions for said distributed copying operation. The request may be a request to perform an I/O operation associated with a device being serviced by said director. The device may be one of a source device or a target device for which said distributed copy operation is being performed. The entity may be a host and said request may be a data request.

In accordance with another aspect of the invention is a data storage system comprising: a director which receives a request from an entity connected to the data storage system; code that determines if said director is performing discovery processing associated with a distributed copy operation; and code that, if said director is performing said discovery processing, suspends said discovery processing to perform said request, wherein said suspending includes saving discovery context information describing a state of said discovery processing, said discovery processing determining one or more paths in connection with said distributed copying operation. The request may be a request to perform an I/O operation associated with a device being serviced by said director. The device may be one of a source device or a target device for which said distributed copy operation is being performed. The entity may be a host and the request may be a data request.

In accordance with another aspect of the invention is a method of performing discovery processing of a director of a data storage system comprising: determining one or more local ports of said director; and determining all accessible remote ports for each of said one or more local ports of a director, wherein state information is stored representing a state of said discovery processing at a point in time to enable resuming said discovery processing if said discovery processing is interrupted, and wherein said discovery processing is interrupted when said director receives a request from an entity in order to process said request. The discovery processing may be performed by a director of a data storage system, said director including said one or more local ports. The discovery processing may be performed as part of processing for a distributed copy operation. The request may be an I/O operation which includes accessing data on a device serviced by said director. The state information may be stored on a non-volatile storage device. The entity may be a host, and said request may be a data request.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of an embodiment of a partition size map;

FIG. 6 is an example of an embodiment of a heartbeat table;

FIG. 7 is an example of an embodiment of a copy state bitmap;

DETAILED DESCRIPTION OF EMBODIMENT(S)

Figure 1:
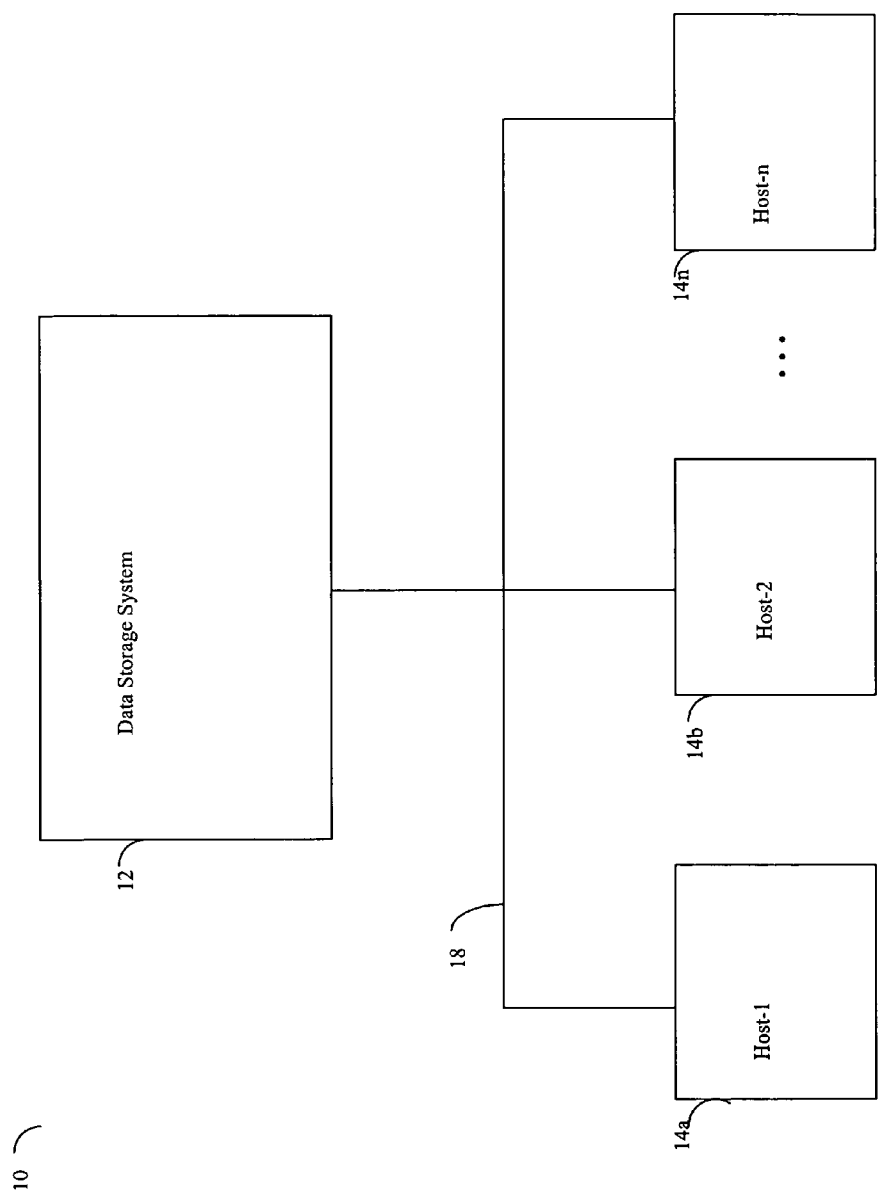
FIG. 1 is an example of an embodiment of a computer system according to the present invention.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
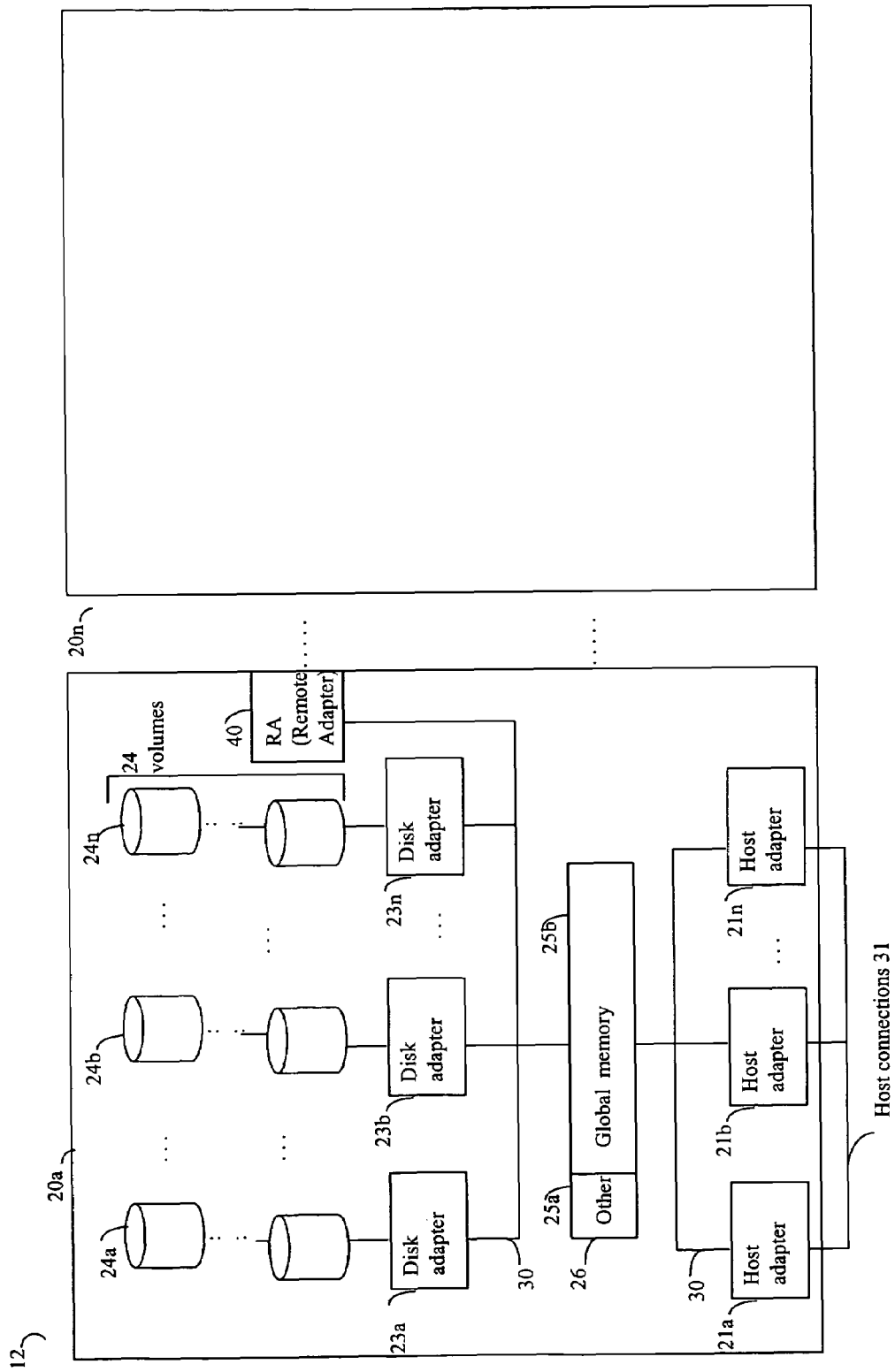
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
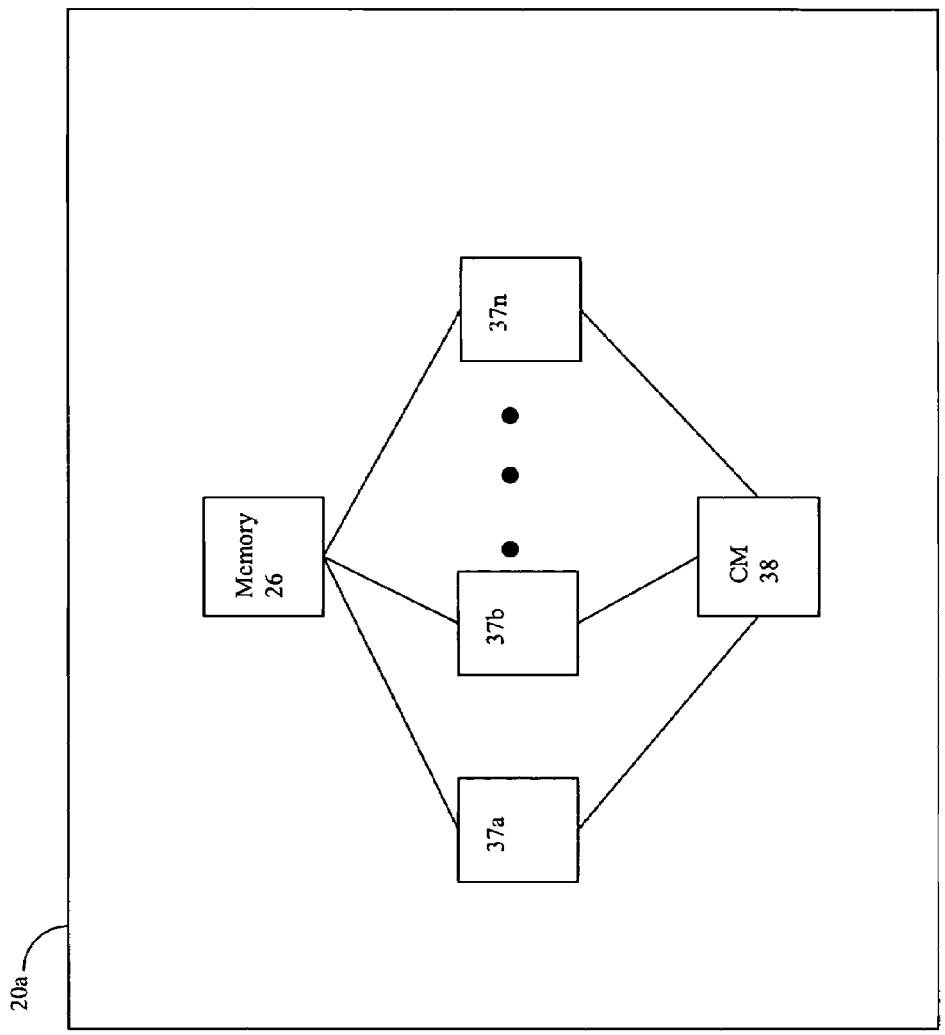
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
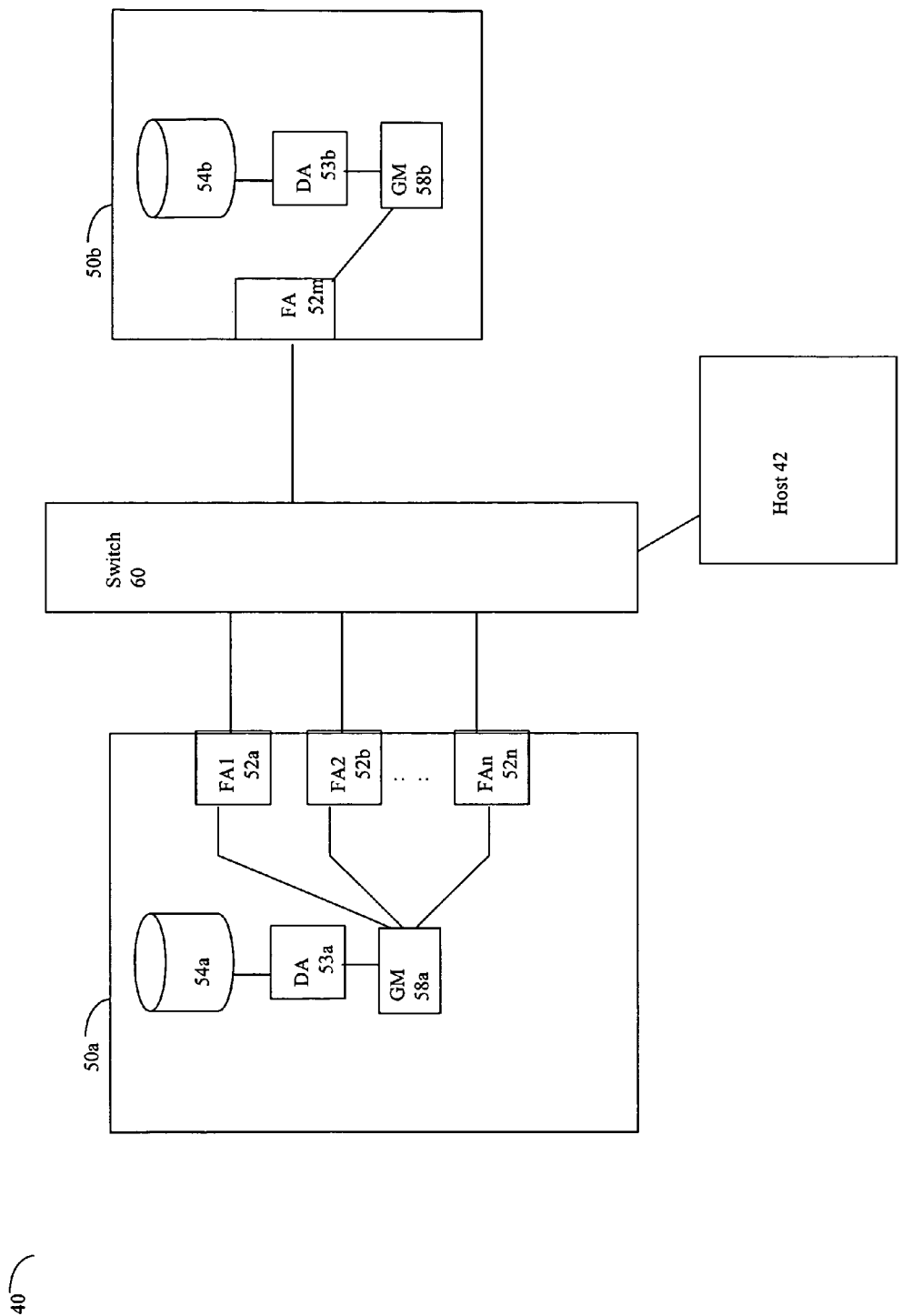
FIG. 3 is a simplified illustration of an example of an embodiment of the computer system that may be used in connection with the techniques described herein.

Referring now to FIG. 3, shown is an example of an embodiment of a computer system 40 that may be used in connection with the techniques described herein. It should be noted that the embodiment illustrated in FIG. 3 is a simplified view of components of a computer system as generally illustrated in FIGS. 1 and 2A, for example, including only some detail of the data storage systems 50a and 50b for the sake of illustration.

Included in the system 40 are data storage systems 50a and 50b, a switch 60 and a host 42. Each of the data storage systems 50a and 50b and the host 42 may communicate using switch 60. In this example, the data storage system 50a includes a data storage device 54a, a DA 53a, global memory (GM) 58a, and multiple Fibre Channel Adapters (FAs) 52a-52n. Each of the FAs 52a-52n has a Fibre Channel connection to the switch 60 to facilitate communications with the data storage system 50b and the host 42. The data storage system 50b includes FA 52m with a Fibre Channel connection to the switch 60 to handle communications between the switch 60 and the data storage system 50b. The data storage system 50b also includes a data storage device 54b serviced by DA 53b and GM 58b.

The host 42 may issue a command to data storage system 50a through switch 60 and one of the FAs 52a-52n. Similarly the host may communicate with the data storage system using switch 60 and FA 52m. As will be described in more detail in following paragraphs in one illustration, the data storage systems 50a may communicate with data storage system 50b over switch 60 using one or more of the FAs 52a-52n and FA 52m in which data may be copied from device 54a of data storage system 50a to device 54b of data storage system 50b.

A command may be issued from the host 42, other system connected to the data storage systems (not shown), or from a task executing within the data storage system 50a, to create a copy of the data from device 54a to remote device 54b. This command may cause a copy task to execute within the data storage system 50a to copy the data to system 50b. In one embodiment, with reference to FIG. 3, the FAs 52a-52n may execute code to perform the copying of data from 54a to 54b. Data may be copied from 54a by DA 53a to GM (Global Memory) 58a. Data from GM 58a may then be communicated to one of FA 52a-52n, switch 60, and then to FA 52m where the data may be stored in GM 58b. DA 53b may then transfer the data from GM 58b to the device 54b. The foregoing may be used in creating a copy of data on device 54a on device 54b and may be performed with one or more of FAs 52a-52n using a distributed copying technique described in more detail in following paragraphs.

In utilizing the distributed copying technique described herein, the source data to be copied, such as the data from device 54a, is divided into multiple partitions. Each of these partitions may be copied in a piecewise fashion by multiple FAs from the source to the destination as each FA has available processing cycles to perform a portion of the copying. In one embodiment, each of the device or devices to be copied, such as 54a, may be partitioned into equally sized partitions. Each partition may include one or more tracks of data. The size of each of the partitions may be a value communicated to the one or more FAs in the data storage system 50a in any one or more of a variety of different ways known to those of ordinary skill in the art. For example, the size of each of the partitions may be read from a configuration file, set as an environment variable, or even specified as a value included in the code executed by each of the different FAs. It should be noted that although in this example, the partitions are of a fixed size, an embodiment may also have partitions that are of varying sizes for a single device.

The distributed copying technique of FIG. 3 is described in connection with a data "push" where the FAs are located in the same data storage system as the data source and push the source data to a remote destination. It should also be noted that the techniques described herein may also be used in connection with performing data "pull" where, with reference to FIG. 3, the FAs may be pulling or copying data from the remote data storage system such as 50b to a destination or target data storage system, such as 50a.

Referring now to FIG. 4, shown is an example representation of a map that may be used in an embodiment with varying partition sizes for a device. The example 70 may be a representation of a partition size map for a device. Included in 70 is a first column 72 with an entry for each partition, and a second column 74 with a range indicator for the corresponding partition. The representation 70 may be stored, for example, in global memory on data storage system 50a accessible for read access by each of the one or more FAs included in data storage system 50a performing the distributed copying technique described herein. It should be noted that in the event that the partitions are of equal size, a map or table such as indicated by the representation 70 may be omitted.

Using the distributed copying technique, as an FA has available processing cycles, the FA is allocated responsibility for migrating or copying a particular partition from data storage system 50a to data storage system 50b. Accordingly, each time an FA becomes idle, that particular FA may copy a remaining partition from the source to the destination or target device in the data storage system 53b. Use of a distributed copying technique as described herein provides for a flexible distribution of copying between various FAs available at particular points in time.

Figure 5:
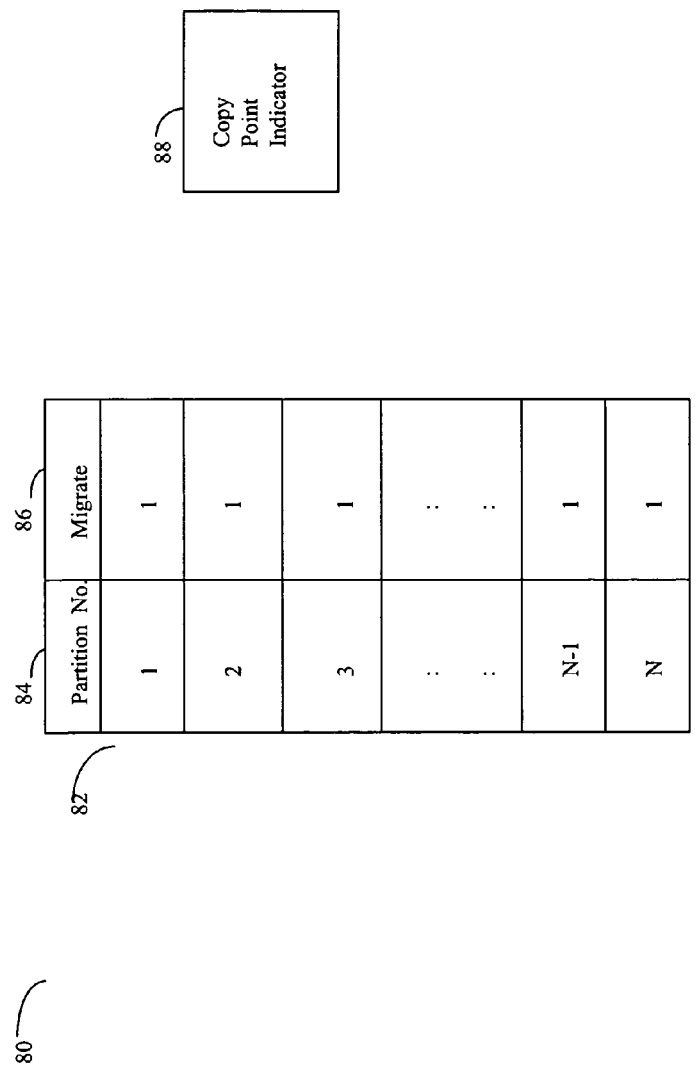
FIG. 5 is an example of an embodiment of a migration bitmap and copy point indicator.

Referring now to FIG. 5, shown is an example 80 of a migration bitmap 82 and a copy point indicator 88 that may be used in facilitating the distributed copying technique. The migration bitmap 82 includes a first column 84 with a partition number having a corresponding entry in column 86 with a migration status. The migration bitmap 82 and copy point indicator 88 may be stored in the global memory of a data storage system which includes the FAs accessing the bitmap 82. An embodiment may include a migration bitmap for each device, or portion thereof, to be copied. In one embodiment, the migration bitmap may have all entries in column 86 initialized to one (1) indicating that each partition of data has not yet been migrated or copied from the source to the destination device. As each particular partition of data is migrated or copied from the source to the destination device, the partition's corresponding entry in the migration bitmap in column 86 is set to zero.

Figure 6:
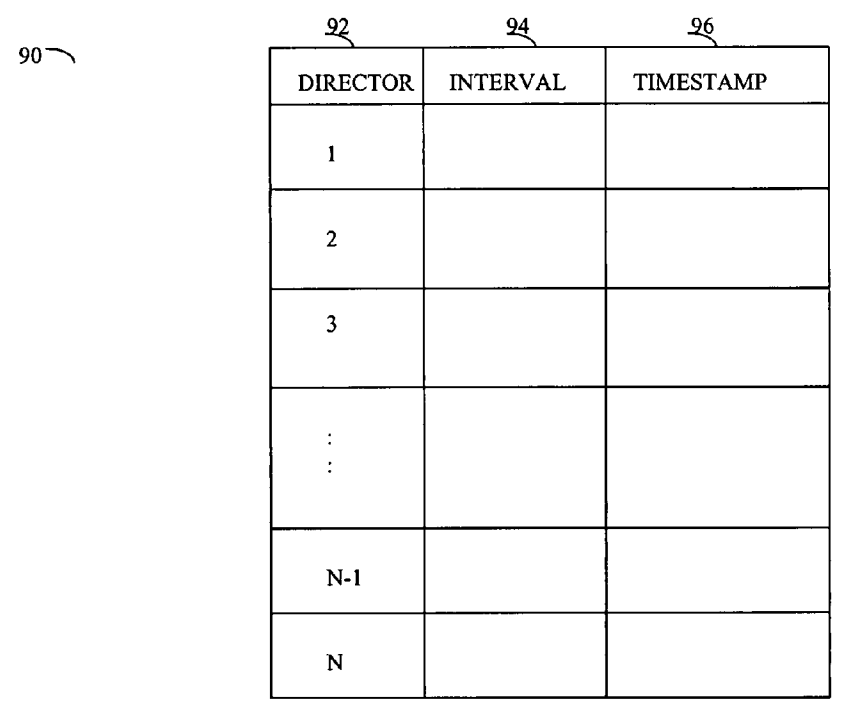
Figure 7:
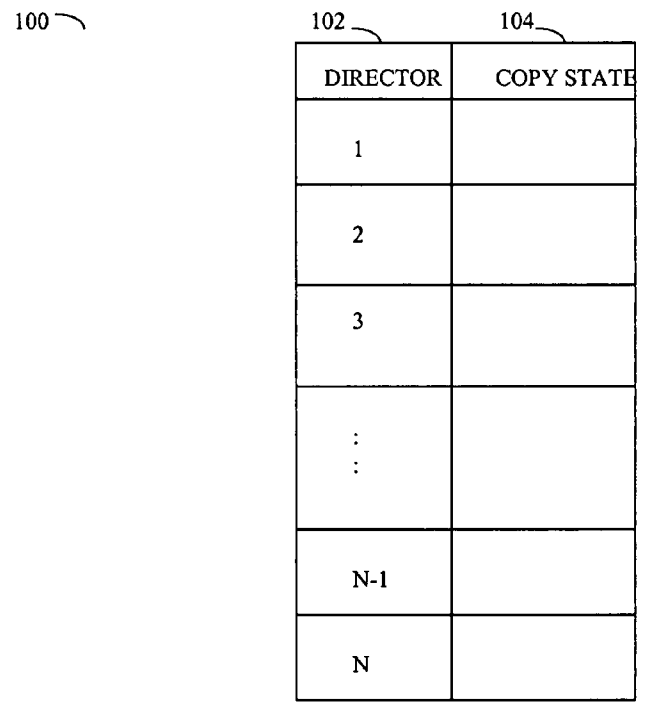

Access to the migration bitmap 82 and other resources described herein, such as the copy point indicator 88 and tables of FIGS. 6 and 7, used in performing the distributed copying processing may be synchronized using any one or more different techniques known to those of ordinary skill in the art which may also vary in accordance with each embodiment and synchronization mechanisms available therein. It should be noted that although processing steps refer to accessing the shared resources without explicit mention of using any synchronization to ensure exclusive access, use of such synchronization techniques in connection with processing described herein will be apparent to those of ordinary skill in the art.

The copy point indicator 88 is a value representing the last partition or high water mark allocated to an FA for copying. As a particular FA becomes available to perform a portion of the copying, the FA reads and updates the copy point indicator variable 88 which may also be stored in global memory of a data storage system. The FA currently reading the value of the copy point indicator increments the copy point indicator to reflect the location that the FA will begin copying the next subsequent partition from. Once an FA has completed migrating the data for a particular partition from the source to the destination device, the FA updates the appropriate migration status in column 86 of the migration bitmap 82 for the partition which has just been migrated.

Prior to any migration of the data for a particular device or devices being performed, the copy point indicator 88 may be initialized to a value, such as zero (0) or −1 indicating that no partitions have yet been migrated from the source to the destination device.

Referring back to FIG. 3 to illustrate the distributed copying technique thus far described, each of the FAs 52a-52n of data storage system 50a may be designated as possible candidates for participating in the distributed copying technique for copying data from device 54a to device 54b. Initially, FA1 52a may be the first FA having available processor cycles. FA1 reads the copy point indicator 88 which indicates that no partitions have yet been migrated. Accordingly, FA1 updates the copy point indicator and claims responsibility for migrating the first partition and accordingly setting the copy point indicator to this value. FA1 then begins migrating the first partition of data. While FA1 is copying the first partition, FA2 becomes idle and reads and updates the copy point indicator 88 indicating that FA2 will migrate a second partition of data. While both FA1 and FA2 are copying their respective partitions, FA3 now becomes available and reads and updates copy point indicator 88 indicating that FA3 will migrate the third partition of data. At this point, each of FA1 through FA3 may be in the process of migrating a different partition from the source to the destination device. Each of FA1 through FA3 performing its copying independent of the other FAs.

The particular configuration of the FAs within a data storage system may vary with each embodiment and this may affect the rate at which a particular FA is able to copy a particular partition. For example, a particular FA may also be connected to, and handle communications for, a host such as host 42. However, one or more particular FAs, such as FA1, may not be responsible for handling host communications and may have more idle processor cycles to allocate to copying data. The foregoing describes a distributed, unbalanced system such that whenever a particular FA is available and free, that particular FA may copy the next subsequent partition which has not yet been allocated for migration to an FA.

In connection with the distributed copying technique described herein, one of the FAs may cease processing or otherwise become unavailable for copying. Such a status of an FA, or other director, may be characterized as a dead state. Additional steps may be taken to ensure that the copying from the source to the destination device is complete even when an FA enters the dead state without completing migration of an allocated partition. In order to determine whether a particular director is dead or alive, an embodiment may use any one or more of a variety of different techniques. In one embodiment, each of the directors, including the FAs as well as DAs, and other directors within a data storage system, may update a particular location in global memory at predetermined time intervals. The foregoing may be characterized as a heartbeat of each of the different directors. In the event that a heartbeat is not detected for a first director by a second director, the second director may conclude that the first director is in a dead state.

Referring now to FIG. 6, shown is an example representation 90 of a heartbeat table that may be stored in global memory on a data storage system. Each director, including DAs, RAs, and FAs, may be associated with a unique row in the representation 90 as indicated by the director identifier in column 92. Each director may be expected to report or update the time stamp value in column 96 at each particular interval as indicated by column 94. The repeated recordation and reporting of the time stamp in column 96 at each of the particular time period intervals as indicated by column 94 may be characterized as the heartbeat of the associated director as indicated in column 92. In the event that the current time advances past the last time stamp value plus the interval for a first director, other directors in this embodiment assume that the first director is in the dead state. In addition to each director being expected to update or write its corresponding time stamp value into the global memory at pre-determined time intervals, each director also reads the values in the representation 90 in order to determine which other director may have entered the dead state. For example, as part of normal processing, each director may check the heartbeat status of every other director once a second, or other time period that may vary with each embodiment. In the event that a particular director detects that another director is dead because a heartbeat has not been received within an expected time period, that particular director may then update other values as may be maintained within the global memory to indicate that this particular director is now dead rather than alive. It should be noted that although only the FAs in this particular example are used in performing the distributed copying technique, FAs, RAs, DAs and other directors within a data storage system may perform a determination that a particular FA is in the dead state and accordingly update one or more pieces of state information that may be included in the global memory to indicate a change in director status from alive to dead.

In the event that each of the directors has the same time interval or heartbeat period within which a time stamp update is expected, the table 90 may omit the intervals 94.

Referring now to FIG. 7, shown is a representation of a copy state bitmap 100 that may be used to indicate the copy state of each of the one or more FAs. In one embodiment, the copy state of an FA may be one of four particular states including not participating, copy in-progress, copy is failed or dead, and copy complete or done. The first state of not participating may be used during configuration to designate that a particular FA will not participate in a distributed copying technique. The copy in-progress state may indicate that the particular associated FA is in the process of copying a partition. The failed or dead status is used to indicate that a particular director has gone off line or is otherwise unavailable for performing a copy technique. For example, in the event that a first director determines that a second director which is an FA has a heartbeat that not been received within an expected time period, the first director may update the second director's copy state in the representation at 100 to indicate that that particular director is dead. It should also be noted that a particular director may change its own copy state to indicate a failed or dead when performing particular operations such as, for example, when an FA detects that it is entering a shut-down state. A copy done or complete copy state may be entered once a particular FA has completed migration of a partition from a source to the destination device and there are no remaining partitions to be copied. It should be noted that an embodiment may have other copy states than as described herein. In the event that one or more of the FAs enters a dead state and does not complete copying or migrating a partition, processing steps are taken to ensure that all partitions are copied for those FAs which have failed to complete migrating a claimed partition.

What will now be described are processing steps of the distributed copying technique including steps to ensure copying of a first partition associated with an FA which has died while the FA's status indicates a copy in-progress for the first partition.

Figure 8:
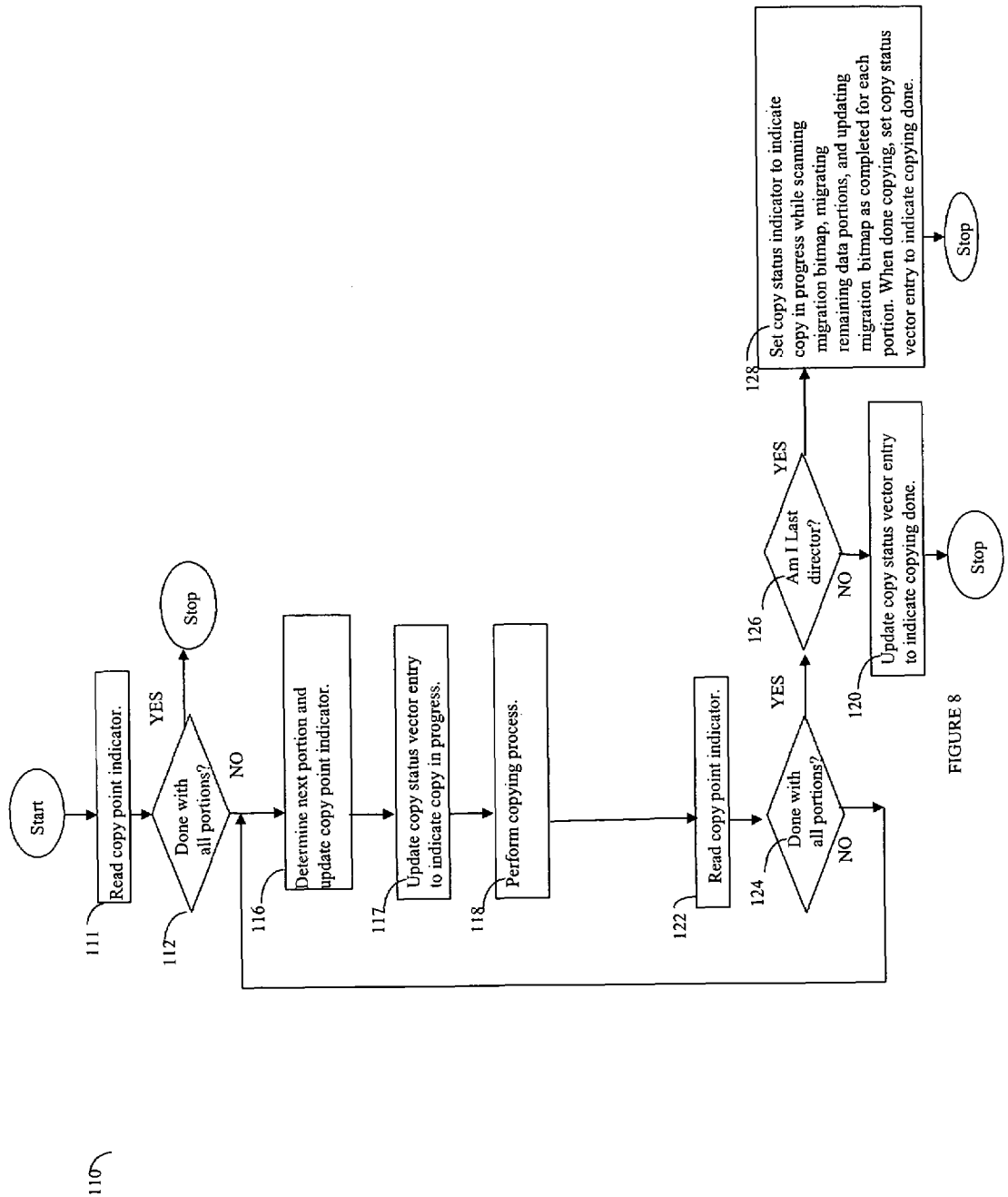
FIGS. 8 and 9 are flowcharts of processing steps of one embodiment for performing a distributed copying technique.

Referring now to FIG. 8, shown is a flowchart 110 of processing steps that may be performed for a distributed copying technique. The processing steps of flowchart 110 may be performed by each of the FAs, for example, by executing code to perform the processing steps of flowchart 110. At step 111, the copy point indicator value is read. At step 112, a determination is made as to whether the copy point indicator indicates that all partitions have been copied. If so, processing of flowchart 110 stops. Otherwise, control proceeds to step 116 to determine the next partition to be copied and accordingly update the copy point indicator. At step 117, the FA updates its corresponding copy status vector entry to indicate that the FA is currently beginning to copy a partition. At step 118, the FA performs the copying process. Control then proceeds to step 122 to read the copy point indicator. A determination is made at step 124 as to whether all of the partitions have been allocated for copying. If not, control proceeds to step 116 to begin copying the next partition. Otherwise, control proceeds to step 126 where the FA makes a determination as to whether the FA performing the steps of flowchart 110 is the last FA completing copying associated with the migration of the source device. The determination at step 126 may be performed by an FA, for example, by examining the copy state vector 100. An FA may determine that it is the last executing FA if all other FAs have a corresponding copy state which does not indicate that a copy is in-progress. If the current FA determines that it is the last director at step 126, control proceeds to step 128 where the last FA performs a clean-up process to ensure that all of the data for the source device has been migrated. This is performed at step 128 by having the last FA set its copy status indicator to in-progress while scanning the migration bitmap, migrating all unmigrated remaining data portions, and updating the migration bitmap in accordance with any partitions migrated. Upon completion of copying at step 128, the copy status vector entry for that particular FA is updated to indicate that the copying is done or complete. If at step 126 it is determined by the current FA that the current FA is not the last FA performing the copy or migration process, control proceeds to step 120 where the copy status vector entry for that particular FA is updated to indicate that the copying is done or complete. Processing of flowchart 110 then stops.

It should be noted that the foregoing provides for the last FA to perform any necessary clean-up ensuring that all of the data has been migrated from the source to the destination in the event that another FA has died while in the copy in-progress state. As described above, the last FA is the single remaining FA executing steps in connection with performing the copy or migration of a data partition.

An additional problem that needs to be taken into consideration with the distributed copying technique is the possibility that the last FA responsible for the clean-up may also die during the clean-up process, or may die while in the in-progress copying state.

Figure 9:
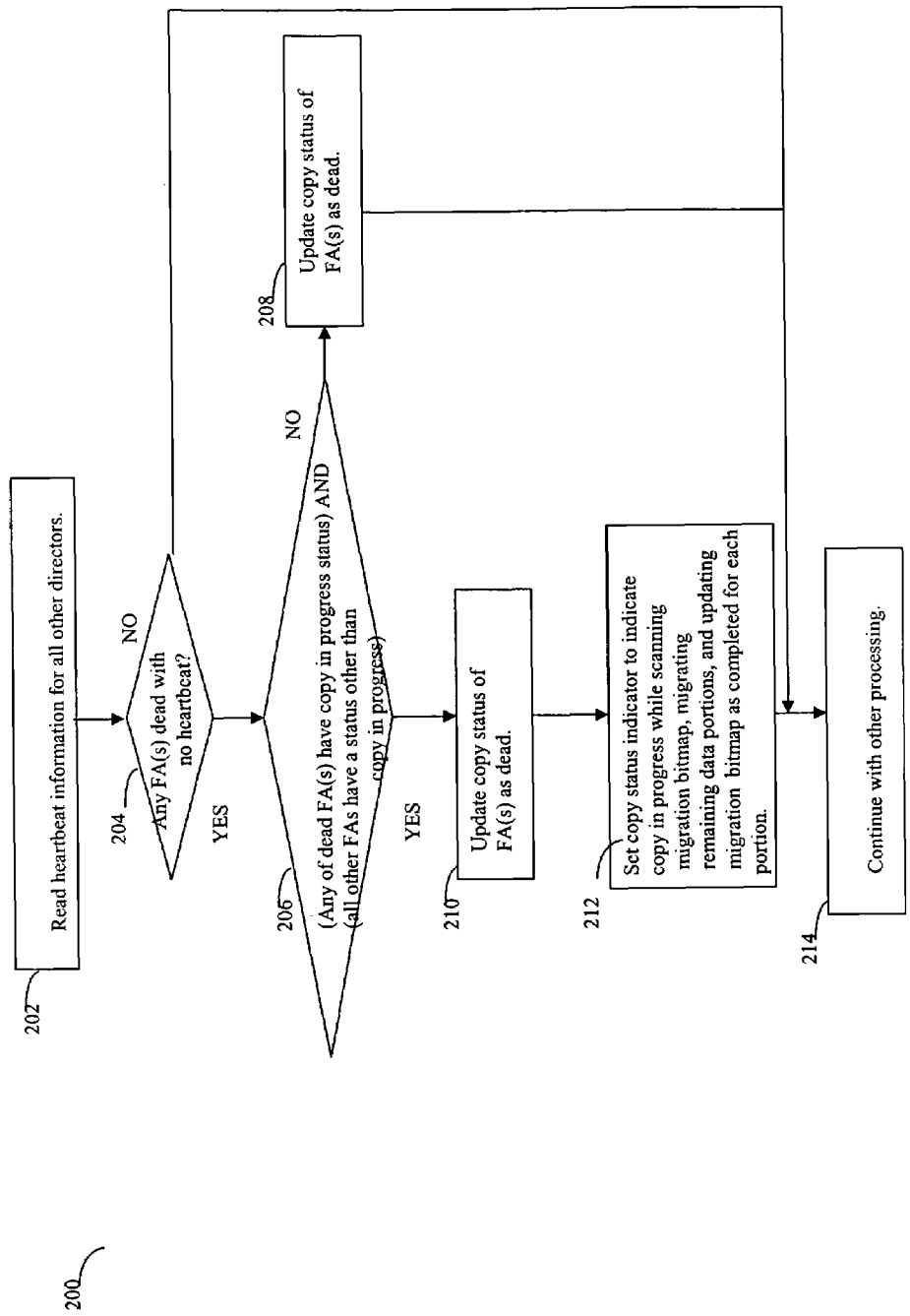

Referring now to FIG. 9, shown is a flowchart 200 of processing steps that may be executed by each of the FAs at pre-determined time intervals as part of normal processing. The steps 200 may be performed as part of a normal processing mode of an FA, for example, as described elsewhere herein in connection with reading and/or writing heartbeat information. At step 202, the heartbeat information for all of the other directors is read. At step 204, a determination is made as to whether any of the FAs may be characterized as dead by not having a heartbeat received within a pre-determined time period. If a determination is made at step 204 that no FAs are dead, control proceeds to step 214 to continue with other processing. If, at step 204, it is determined that an FA may be characterized as dead because its heartbeat has not been received within an expected time period, control proceeds to step 206. At step 206, a determination is made as to whether any of the dead FAs determined at step 204 additionally have a copy status indicating a copy is in-progress, and whether all other directors have a copy status other than copy in-progress. In connection with the determination at step 206, if any of the dead directors have a copy-in-progress status and the heartbeat has not been received within an expected time interval, this may indicate that that particular director has died in the progress of performing the migration. Additionally, if there is any FA having an associated copy status of in-progress whose heartbeat has been received (alive) which is currently performing a copy (in-progress), the current FA does not want to begin the clean-up process (step 212) since there is still a remaining FA executing. Accordingly, the step 206 decision evaluates to yes, only if there is currently no FA in the process of migrating a partition (alive and in progress copy status) and one or more of the FAs has died during a copying process.

If step 206 evaluates to yes, control proceeds to step 210 to update the copy status of the one or more FAs determined as dead at step 204 with no heartbeat. Control proceeds to step 212 to begin the cleanup ensuring that all of the data has been copied from the source to the destination device or devices. At step 212, the FA set its copy status indicator to in-progress while scanning the migration bitmap, migrating all remaining data portions, and updating the migration bitmap in accordance with any partitions migrated. Control proceeds to step 214 to continue other processing.

If step 206 evaluates to no indicating that some of the FAs have died while in the process of migrating a partition but there is at least one FA still executing, control proceeds to step 208 to update the copy status of the one or more FAs determined as dead. Processing continues with step 214. It should be noted that the last FA which is still executing will perform the cleanup of any other FAs which have died during data migration because the last FA (with reference to FIG. 8) will determine that it is the last director and perform the processing of step 128. In the event that the last FA dies while performing the cleanup or while performing a data migration, at some point later, another FA will evaluate step 206 to yes and perform the processing of steps 210 and 212.

It should be noted that multiple directors may perform the processing of flowchart 200 at a particular point in time in the event that the last FA has failed and another FA has failed during a data migration.

Referring back to FIG. 3, the distributed copying technique is described in connection with a data "push" where the FAs are located in the same data storage system as the data source and push the source data to a remote destination. It should also be noted that the techniques described herein may also be used in connection with performing data "pull" where, with reference to FIG. 3, the FAs may be pulling or copying data from the remote data storage system such as 50b to a destination or target data storage system, such as 50a. Such an example using the techniques described herein with a data pull will now be described.

Figure 10:
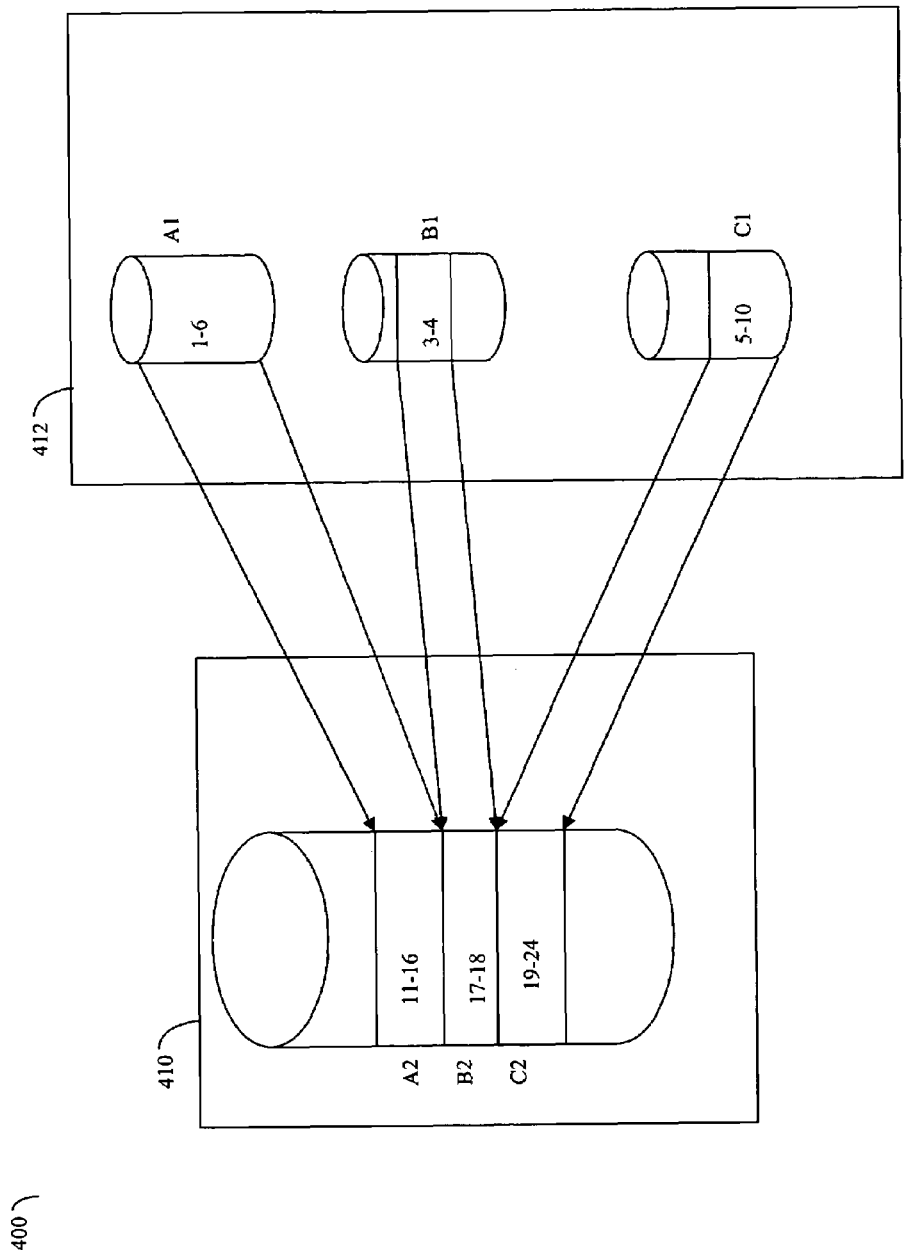
FIG. 10 is an example illustrating a data pull operation with multiple source devices and a single target device with multiple copying sessions.

Referring now to FIG. 10, shown is an example 400 illustrating a source data storage system and a destination or target data storage system with respect to multiple data pull sessions. In this example, the data storage system 410 may be the target data storage system resulting from migrating data from corresponding portions of multiple data storage devices in source data storage system 412. In this example, data is being migrated from data storage devices A1, B1, and C1 of data storage system 412. The entire data portion of device A1 is migrated to the data storage system 410 having a corresponding portion A2 in a first pull session. A portion of device B2 is migrated to the data storage system 410 having a corresponding device portion B2 in a second pull session. The corresponding portion of device C1 is migrated from the data storage system 412 to the data storage system 410 have a corresponding portion C2 in a third pull session. The data migration using the distributed copying technique described herein may be used to copy data from multiple devices. The data copied from a device may be all the data from the device, or a portion of the data on the device as illustrated in connection with 400 of FIG. 10.

Use of the foregoing as illustrated in FIG. 10 provides for concatenating different portions of data from one or more source devices included in data storage system 412 into a single contiguous data portion on a destination such as the device of the data storage system 410. The foregoing illustrated in FIG. 10 shows multiple source devices with varying amounts of data on each device being copied to a single destination device with a data pull operation using multiple pull sessions. It should be noted that the techniques illustrated in FIG. 10 may also be used with a data push operation where data from one or more source devices may be pushed to a single destination device. Other variations and configurations possible in connection with designating source and destination copy locations are possible as apparent to one of ordinary skill in the art.

It should be noted that other operations may be performed in addition to the copying of a particular data partition. For example, an embodiment performing a data pull operation by multiple FAs, each of the FAs may determine a partial checksum on a copied data partition.

It should be noted that although only a single destination or a single source device may have been illustrated herein, the techniques described herein may be performed in connection with multiple source and multiple target devices. Additionally, although the distributed copying technique as described herein includes processing steps performed by a processor of an FA executing code, the technique described herein may be performed by other processors within the data storage systems. The particular examples set forth herein for purposes of illustration should not be construed as a limitation of the techniques.

In connection with the foregoing distributed copying, different techniques may be used in connection with selecting a path from a source device to a target device. Selection of a path may include selection of a source director, such as an FA, on a source data storage system servicing the source device as well as a port associated with the source director. Additionally, selection of the path may include selection of a target device, and a port associated with that particular target device. Different source directors, and ports included therein, may have different connections to target directors. The particular one or more paths between any source device and target device may be determined as part of a discovery process. The discovery process may be performed, for example, as part of initial processing when the foregoing distributed copying technique is initiated. Prior to beginning the distributed copying process, each source director, or FA in the foregoing example, may discover paths between each port of the source FA itself and visible ports of target FAs on the target data storage system. The discovery process may be performed by executing code included in each FA prior to each FA commencing copying as part of the distributed copying technique described herein.

It should be noted that the particular FA performing the discovery process depends on whether the source or target data storage system is driving or controlling the data copying. For example, the particular FA performing the discovery process may depend on whether the data is being pushed or pulled. If the data is being pushed, for example, from a source data storage system to a target data storage system, the source FA of the source data storage system may perform the discovery process and other processing for path selection. If the data is being pulled from a source data storage system to a target data storage system, the target FA of the target data storage system may perform the discovery process and other processing for path selection. Although examples described in following paragraphs may refer to data being pushed from a source to a target, this is for illustration purposes of the techniques described herein and should not be construed as a limitation. As will be appreciated by those of ordinary skill in the art, the techniques described herein may be used in connection with a data push or pull.

Figure 11:
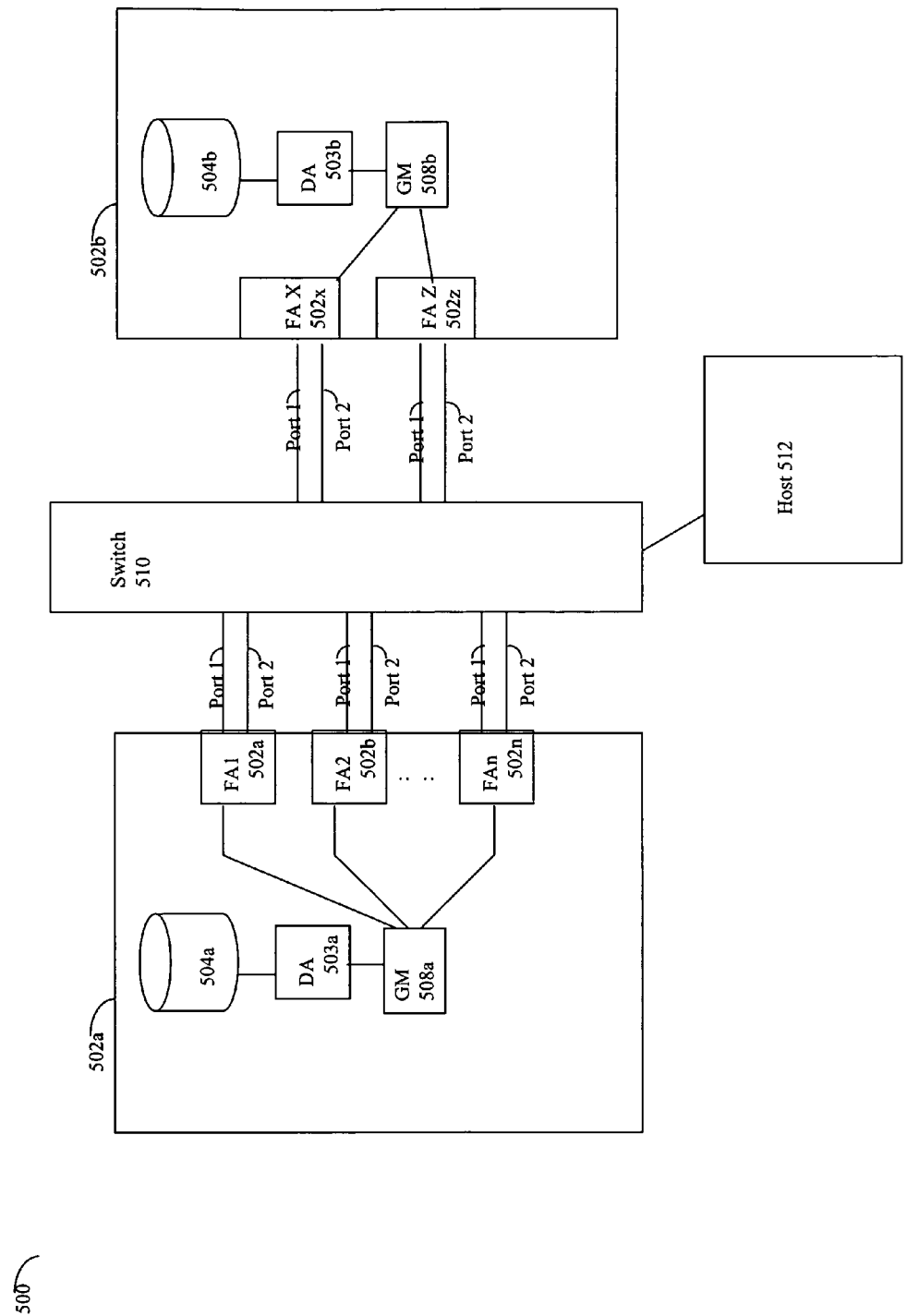
FIG. 11 is an example of an embodiment of a computer system that may be used in connection with path determination techniques described herein.

Referring now to FIG. 11, shown is an example embodiment 500 of a computer system that may be used in connection with path determination techniques described herein with the distributed copying. It should be noted that components of FIG. 11 are similar to those described elsewhere herein in connection with other figures with additional detail for the purpose of illustrating the path determination techniques described herein. In the embodiment described herein, each FA may have 2 ports although other embodiments may use different directors and/or have a different number of ports for each director. In connection with the discovery process of the distributed copying technique when data is pushed from 502*a* to 502*b*, prior to FA1 502*a* beginning copying, FA1 502*a* selects a path from one of its ports to a visible target port in a target FA servicing the target device. Similarly, other FAs, such as FA2 502*b*, may select a path from one of its ports to a target port of a target FA servicing the target device. Both FA1 and FA2 may see the same multiple target ports. For example, both FA1 502*a* and FA2 502*b* may identify 4 possible target ports (port 1 and port 2 of FAX 502*x* and port 1 and port 2 of FAZ 502*z*) from which to select as its associated target port for copying.

Different techniques may be used in selecting a particular target port servicing a target device for each port of a source FA servicing a source device. A performance bottleneck may result in the event, for example, that both FA1 502*a* and FA2 502*b* select the same visible target port when other target ports are accessible and may be used with the distributed copying techniques described herein. Existing techniques may present a solution for source and target port selection using firmware within the switch 510. For example, firmware within the switch 510 may include a table for source and target port configuration designating which one or more target ports are "visible" and/or available for use with one or more particular source ports. The foregoing is one approach which may reduce performance problems with the distributed copying technique. However the foregoing may also result in difficulties, for example, if one of the ports designated in the table becomes unavailable. Reconfiguration may require undesirable modification of the firmware tables within the switch.

As an alternative to the foregoing technique using the switch to configure path selection, code may be executed within each of the source FAs for discovery and path selection. After a source FA performs the discovery process, the source FA may randomly select an available target port from all of those ports servicing the target device which are visible and designated for use with the distributed copying technique described herein. This selected target port may be designated as the preferred target port for a particular source port. In the event that this preferred target port pairing becomes unavailable, for example, because the preferred target port or associated target FA goes down or offline, another visible target port may be used. The foregoing provides for hierarchical selection of a path from a source to a target by having a preferred path specified as a first path preference. In the event that the preferred path is unavailable during transmission of data from a source device to a target device, an alternative path from the source port to another target port servicing the target device that is currently visible and available for use with the distributed copying technique may be selected. In one embodiment, a link may be established and maintained between a source and target port pairing until either the copying operation session is complete, or, there is a link failure, for example, due to a problem with the target port. If a failure is detected with the link to the target port prior to completion of the copying operation session, an alternative target port servicing the target device may be selected. In one embodiment, an alternative target port may be selected randomly from those one or more remaining target ports servicing the target device which are visible from the source port and designated for use with the distributed copying technique.

Referring to FIG. 11, the code for performing the random selection of a target port may be executed by each of the FAs 502a-502n when determining source-target port pairings. As described elsewhere herein, this determination may be performed, for example, prior to commencing copying data to the target, if a path associated with a pairing becomes unavailable, and the like. The set of source and target FAs and associated ports available for use with the distributed copying techniques may be designated as a portion of all source and targets available in a system, or as a portion of all those source and targets that may be used to service the source and target devices. An embodiment may designate that particular ports and/or particular FAs may be used for certain types of operations, such as for use with the distributed copying techniques. The source and target FAs and/or ports that may be used with a distributed copying operation may be specified, for example, in a configuration file, a portion of global memory, or other location which is accessible to all source FAs within a data storage system, such as 502a. An embodiment may also have the code executing in the source FA use a predefined set of source and/or target FAs and/or ports. The code of each FA may randomly select a preferred target port servicing a target device from all those which are both visible from a particular source port and also designated for use with the distributed copying techniques. This selection may be performed initially and used when each source FA copies portions of the data to the remote data storage system.

An embodiment may also include an API (application programming interface) which is invoked, for example, by an application executing on the host 512 to perform the target preference configuration for use in connection with the distributed copying techniques. The API may be used to specify which particular source and/or target FAs alone, or in combination with, particular ports, may be used in connection with the distributed copying techniques. For example, the API may specify a set of source FAs and/or a set of target FAs that may be used in connection with the distributed copying technique. If source and/or target FAs without ports are specified with the API designating particular source and destination FAs for use with the distributed copying technique, code in each of the source FAs may randomly select a preferred source port and target port mapping in accordance with the specified source and target FAs. In the event that the API does not specify one or both of the source or target FAs to be used with the distributed copying technique, code executed in the source FAs may use one or more designated default FAs in the distributed copying operation. The default source and/or target FAs used in connection with a distributed copying technique may be those specified through use of a configuration file, or other setting that may be included in an embodiment. In one embodiment, the code within each of the controlling FAs may use all visible target FAs servicing a target device as a default set of target FAs. Similarly, if no particular set of FAs is specified in the API for the distributed copying technique, an embodiment may use all source FAs servicing a source device in connection with performing the distributed copying technique. The API may be used in order to specify an override of a default set FAs and/or ports that may be used in connection with the distributed copying operation.

As an example, an API, such as API-1 in examples below, may be used to specify which particular FAs may be used in connection with the distributed copying technique. In the following examples, the source and target FAs and ports are all visible to each other as may be determined by the discovery process. With reference to FIG. 11, an application executing on a host may issue an API call to data storage system 502a to use the following FAs in connection with a distributed copying operation:

API-1 ((source_fa=FA1, FA2), (target_fa=FA X, FA Z), ... )

In connection with the foregoing API-1, particular FAs have been designated as for use with the distributed copying technique. Other source FAs, such as FAn, are not designated for use with the distributed copying operation. Code included in each of the source FA1 and source FA 2 may be executed to discover which target ports of the target FAs specified are visible from each of the ports of FA1 and FA2. The code included in each of the source FAs (e.g., FA1 and FA2) may be executed to randomly select a target port which is both visible or accessible (e.g., as determined during discovery) and designated for use with the distributed copying technique (e.g., a port of FAX or FAZ as may be designated via an API).

In another example, the API call may designate particular source and/or target port groupings for use with the distributed copying technique. For example:

API-1 ((source_fa=FA1:port1, port2; FA2:port1), (target_fa=FA X:port1, FA Z:port2), ... )

The code included in the source FA may use the foregoing API designated ports for use with the distributed copying technique. An API call may also include some combination of FA-level or director-level groupings with port-level groupings. The code in the source FA may perform the preferred random port selection and mapping using the port-level designations.

The foregoing describes how an embodiment may use an API to select FAs and/or ports for use with the distributed copying operation without specifying with the API the particular source-target mapping. In the event that the API is used to specify the groupings of FAs (using director-level or port-level specification) without defining the particular preferred source-target mappings, the code included in each controlling FA may be executed to perform the preferred selection and mapping of a source port to a destination port in accordance with the specified groupings.

Through the use of the same, or different, API, an embodiment may use an API to specify the preferred mapping of source FA and target FA pairings. For example, referring to FIG. 11, the API may be used to specify that source FA1 may be paired with target FAX. If all the ports of FAX are accessible from all ports of FA1, code may be executed by the source FA1 to then randomly select one of the two target ports of FAX to be paired with each of the source ports of FA1. Following is an example, illustrating the foregoing preferred mapping:

API-1 ((preferred_fa_pairing=FA1-FAX; FA2-FAZ), ... )

In the foregoing example, the code included in the source FA1 may be executed to determine a target mapping for each of port 1 and port 2 of FA1. The target port for each of these source ports of FA1 is selected randomly between port 1 and port 2 of target port FAX.

The API may also be used to define with more specificity the preferred source port and target port pairings to be used. For example, referring to FIG. 11, the API may be used to specify that source port 1 of FA1 is paired with target port 1 of FAX. In this case, the code executed in FA1 does not need to perform any random selection of ports since the API is used to specify port selection and pairings. Following is an example of an API specifying the preferred source-target port pairings:

API-1 ((preferred_fa_pairings=FA1:port1-FAX:port1), (FA1:port2-FAZ:port1), ... )

It should be noted that an embodiment may combine any one or more of the foregoing API specifications in a single API call. For example, an API may be specified which includes one or more preferred port-level pairings and a designated source and/or target grouping (port-level and/or director level).

An embodiment may also include a required pairing in which a pairing is specified at a port-port level mapping but, rather than be a preferred pairing, it is required. In the event that the particular required pairing is not able to be used, an error may be generated. When establishing a path for transmitting data from source device to a target device, the preferred pairing may be tried first. In the event that there is a problem with transmitting data using the preferred pairing, another different pairing may be used. For a required pairing, no alternative or different pairing is used for data transmissions in the event that the required pairing is not able to transmit data.

Figure 12:
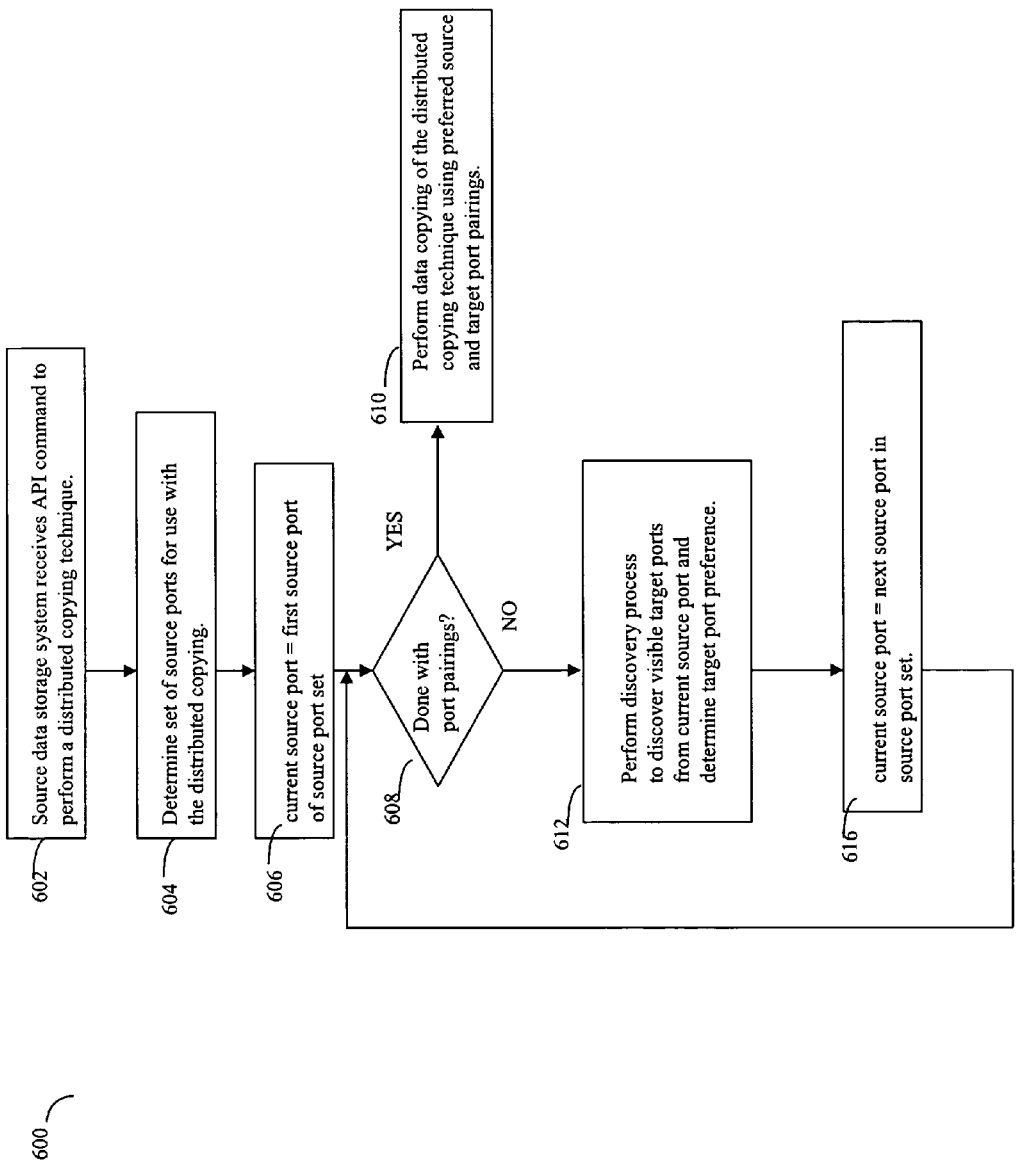
FIG. 12 is a flowchart of steps of one embodiment for determining source and target port pairings.

Referring now to FIG. 12, shown is a flowchart 600 of steps that may be performed in one embodiment in determining source and target port pairings for use with the distributed copying technique described herein copying data from a source device to a target device. It should be noted that the steps of flowchart 600 of FIG. 12 summarize the processing steps just described when copying data from a source device to a target device. In connection with the flowchart 600, one or more API commands may be specified for use in connection with the distributed copying technique. In one embodiment, the distributed copying technique may be characterized as including three phases. A first phase may be characterized as the distributed copying set up or configuration. A second phase is the actual data copying steps of the distributed copying technique. The third phase may be characterized as any clean-up that may be included in an embodiment of a distributed copying technique. In connection with the first phase for the configuration or setup of the distributed copying technique, the setup may include, for example, performing discovery processing and specifying which particular directors and/or ports are to be used in connection with a distributed copying technique.

Data may be saved to non-volatile storage for use in subsequent processing. The data may include, for example, data communicated via the API, discovery-related data, preferred source-target pairings, and the like. Such information may be used, for example, in the event a link goes down, when resuming suspended processing, and the like, as described elsewhere herein in more detail. The second phase is actually copying the data in accordance with the distributed copying technique as described elsewhere herein in accordance with the definition or configuration of the first phase. The final or third phase is any clean-up processing associated with the distributed copying technique. The third phase may include, for example, processing used in taking down any links or connections previously established and used in connection with the copying phase as defined using the source and target port mappings. In one embodiment as described herein in connection with processing steps of flowchart 600 of FIG. 12, a single API may be used in connection with all three of the foregoing phases of the distributed copying technique. An embodiment may also utilize multiple APIs, for example, associated with each of the three phases in order to perform all the processing steps necessary for the distributed copying technique. As will be appreciated by one of ordinary skill in the art, an embodiment may also include a different number of API calls than as specified herein in accordance with a particular embodiment.

At step 602, a source data storage system, such as the data storage system 502a of FIG. 11, receives an API command to perform a distributed copying technique. The API command received at the source data storage system in step 602 may be issued, for example, by an application executing on a host system connected to the source data storage system. At step 604, a set of source ports for use with the distributed copying technique is determined. At step 604, the set of source ports may be specified, for example, as a parameter via the API call received at step 602. An embodiment may specify in the API, for example, a particular list of source ports to be used. As illustrated elsewhere herein, the API included in an embodiment may also allow for specification of source directors or FAs as well as specification of particular source ports. The set of source ports determined at step 604 is determined to be those ports servicing the source device specified via the API, if any are specified, using the director-level groups, port-level groups, or source target pairings described elsewhere herein. In the event that no source ports are specified via the API, a default set or configuration of source ports may be used in an embodiment. The code executing within a data storage system, such as 502a, controlling the distributed copying technique may determine a default set of source ports and source directors to be used in connection with the distributing copying technique. In one embodiment, if no particular source ports or directors are specified in the API, a default designation may be used. In one embodiment, the default may be that all source directors and ports included therein may be used in connection with the distributed copying technique. In the event that the API specifies a source director or directors, the set of source ports at step 604 includes those ports of the API specified source directors. In the event that the API includes source port-level specification (e.g., such as in groups or in pairings), the source ports are included in the set determined at step 604. Note that this set may not include any unavailable or offline ports. At step 606, the first source port within the set determined at step 604 is assigned to current source port. The processing beginning at step 606 walks the list of source ports determined at step 604 to perform a discovery process and determine a target port preference for each of the source ports in the set at step 604. Beginning with the first port assigned to current source port, control proceeds to step 606 to step 608 where a determination is made as to whether processing is complete for all of the port pairings. If so, control proceeds to step 610 to perform data copying of the distributed copying using the preferred source and target port pairings. Otherwise, control proceeds to step 612 to perform the discovery process to discover the target ports which are visible from the current source port and which service the target device, and to determine the target port preference. It should be noted that the processing of step 612 is described in more detail in following paragraphs in connection with other figures. Generally, the processing of step 612 attempts to use any API specified preference for source-target port pairings. In the event that any API specified target port preference is unavailable, an alternative source-target port pairing preference is determined. At step 616, processing continues with the next source port within the source port set (from step 604) by assigning the next source port to the current source port. Subsequently, control proceeds to step 608 to continuing processing with the next source port to determine its corresponding target port preference pairing in accordance with the source and target devices. The foregoing source port processing continues until all of the source ports from the set at step 604 have been processed.

In one embodiment, each of the FAs in the data storage system controlling the copy operation may perform processing steps to determine source and target mappings for ports within that particular FA. In other words, a first FA in the controlling data storage system determines mappings for ports within the first FA. The foregoing describes a distributed aspect of the path determination process where each FA in the controlling data storage system determines mappings for its own ports. In this embodiment, processing of step 610 includes steps to synchronize all FAs prior to copying data. Prior to beginning step 610, all FAs in the controlling data storage system complete discovery processing and determine source-target pairings for use in the distributed copying.

It should be noted that in connection with performing the distributed copying technique, an embodiment may perform additional steps than as described in connection with flowchart 600 of FIG. 12. For example, an embodiment may store information in connection with distributed copying technique on non-volatile storage. This information may include data used when performing the discovery process or other steps that may be repeatedly performed. One example of such information may include discovery process parameters, or any source or target grouping designation which identifies particular ports for use with the distributed copying technique. Such information may be used when reperforming discovery processing in the event, for example, that a source-target path preference becomes unavailable. For example, in the event that a previously established source-target port pairing specifies a path or link that becomes unavailable during transmission of data for the distributed copying technique, the particular source director may reperform the discovery process to determine another target port preference to be used, and to establish a connection therewith from the source port, for use in subsequent data copying for the distributed copying session. This is described in more detail elsewhere herein.

Figure 13:
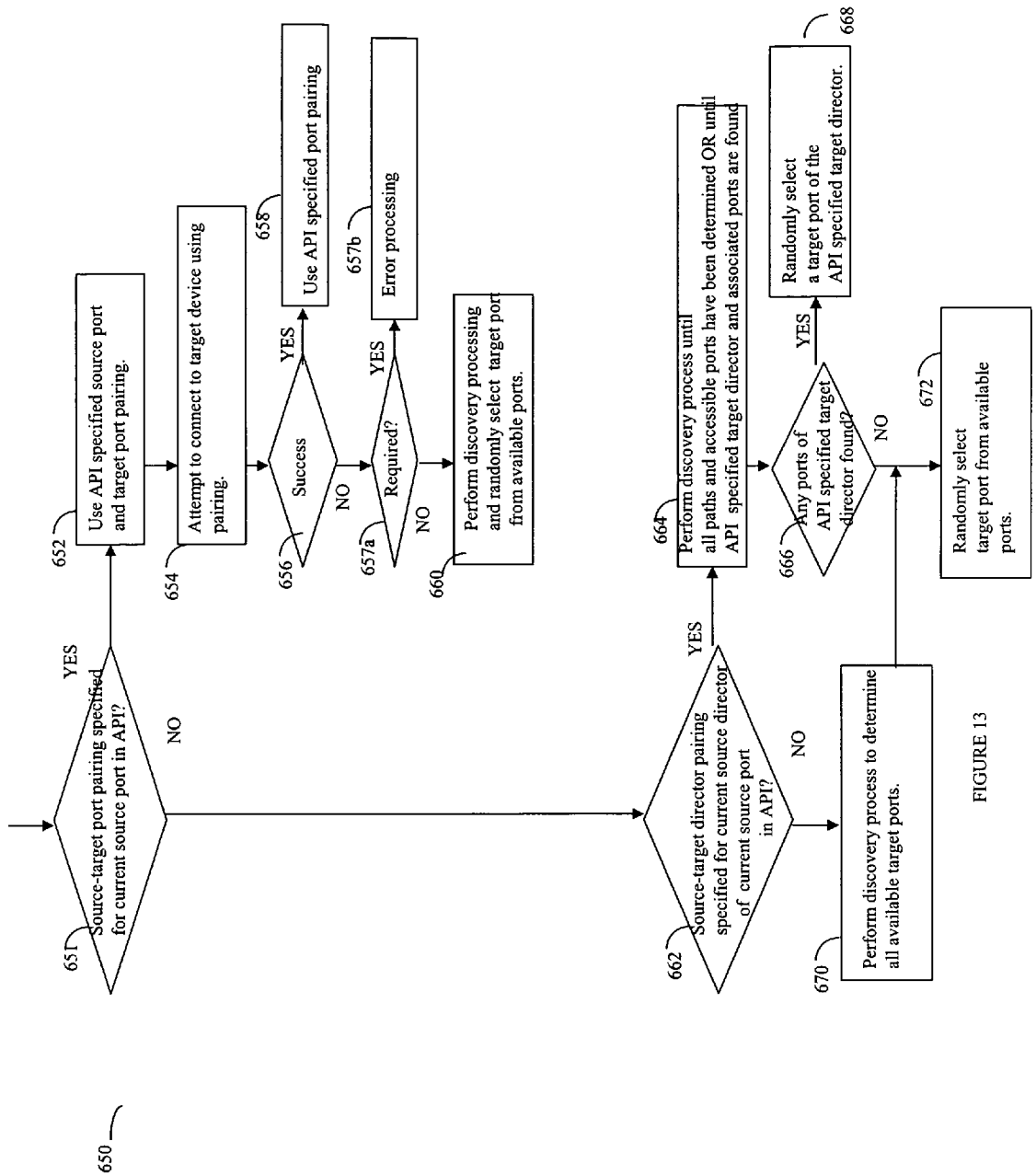
FIG. 13 is an example of more detailed processing that may be performed in an embodiment in connection with discovery and determining source and target port pairings.

Referring now to FIG. 13, shown is a flowchart 650 including more detailed processing of step 612 of FIG. 12 as may be performed in an embodiment. The flowchart 650 of FIG. 13 describes in more detail how the discovery process may be performed in an embodiment, and how the source port and target port preferences may be determined as part of a distributed copying operation in connection with a source device and target device. At step 651, a determination is made as to whether a source-target port pairing is specified for the current source port in the API. If so, control proceeds to step 652 where the API specified source port and target port pairing is used. At step 654, an attempt is made to establish a connection using the pairing to the target device. At step 656, a determination is made as to whether this has been successful. If so, control proceeds to step 658 where the pairing is used as the preference for the current source port. It should be noted that in the event that this is a required pairing, the pairing is used as the required pairing. In the event of a later failure using a required path, no alternative path may be used. If step 656 evaluates to no, control proceeds to step 657*a* where a determination is made as to whether the pairing is required. If so, error processing is performed at step 657*b*. Otherwise, control proceeds to step 660 to perform discovery processing and randomly select a target port from those available target ports. In one embodiment, all ports may be discovered and then a random selection made from those. Processing in connection with step 660 may be used to determine a list of those target ports which are reachable or visible from the current source port servicing a source device. As an alternative, an embodiment may randomly select which port is next to be discovered. If this port services the target device, then it is used in the pairings. In the alternative latter embodiment, the element of randomness may be interjected in the selection process of what is next to be discovered. In the former embodiment, randomness is used in selecting one of the discovered target ports after all possible target ports have been discovered. At most, the discovery process may be performed until all paths and ports have been determined from the current source port. The discovery process as described and used herein may be generally characterized as determining ports that are accessible from the current source port servicing a source device. From these ports, a set of target ports servicing a target device may be determined. If a source-target port pairing is specified for a current source port, the discovery process terminates if the specified target port of the pairing which services the target device has been reached (as illustrated by step 658).

If at step 651 a determination is made that no port pairing is specified for the current source port in the API, control proceeds to step 662 where a determination is made as to whether a director-level pairing has been specified for the current source director of the current source port within the API. In other words, in an embodiment, the API may specify a particular source port and target port pairing such as determined at step 651. An embodiment may also provide for an API in which a director level pairing or specification may be made for a source director and corresponding target director. Rather than specify a mapping of a port to port connection, an embodiment may also allow for a higher level of specificity in which a source director and target director pairing may be made via the API. In the event that a source and target director pairing are specified including the current source port, control proceeds to step 664 to perform the discovery process until one of two events occurs. The discovery process is performed at step 664 until either all ports accessible from the current source port have been determined, or until one or more target ports of the target director included in the director pairing have been reached. As a result of step 664, a list of one or more target ports may be determined. The list determined at step 664 may include all of those ports servicing the target device which are visible or reachable from the current source port in the event that the discovery process completes and does not locate an API specified target director and its associated ports. In the event that the discovery process is performed and a port of the director pairing is reached, the list at step 664 of target ports may include the one or more target ports associated with the target director of the director pairing. At step 666, a determination is made as to whether any port of the target director included in the director pairing has been found. If so, control proceeds to step 668 where a random selection is made from the one or more target ports of the target director servicing the target device included in the pairing which have been discovered as part of the step 664 processing. Otherwise, if step 666 determines that no ports of the target director included in the pairing have been found, control proceeds to step 672 where a random selection of a target port is made from those available ports as determined via the discovery process at step 664.

If step 662 determines that no source-target director pairing has been specified via the API for a current source director of the current source port, control proceeds to step 670 where the discovery process is performed to determine all accessible ports from the current source port. Control then proceeds to step 672 to randomly select a target port from those ports servicing the target device. The set of target ports may be determined as a portion of those ports determined from the processing at step 670.

The discovery processing described herein in connection with steps 670 and 672 may be implemented in a variety of different ways in an embodiment similar to as described in connection with step 660 processing elsewhere herein. It should be noted that any port selected in processing described herein for discovery and in connection with the pairings also services the particular device. For example, a selected target port needs to be active and also needs to service the target device.

It should be noted that the decision processing of step 651 and step 662 may be performed in an embodiment which allows both port and director level pairings or mappings to be specified using an API. As described elsewhere herein in more detail, an API which provides a port level source and target pairing allows for a pairing specification, such as port 1 of FA1 502*a* maps to port 1 of FAX 502*x* of FIG. 11. An embodiment which allows for director level pairings may include an API specified director pairing such as FA1 maps to FAX. In the event that the director level specification source and target pairings are made, processing of steps 662 provides for random selection of a target port in accordance with a source and target director specification made with the API.

As also described herein, an embodiment may utilize an API to specify which particular groups of source directors or ports servicing a source device, and which target directors or ports servicing a target device may be used in connection with a distributed copying technique without specifying a particular mapping or pairing of sources and targets. In other words, an API may also allow as a parameter a group of source and/or target directors, or source and/or target ports without specifying a particular mapping between source and targets. When port-level or director-level source and/or target groups are specified without source-target mappings, the source and/or target groups may affect processing at step 604 of FIG. 12. In the event that a group of source ports or source directors are specified without particular target pairings, step 604 may determine as the set of source ports for use with the distributed copying technique those ports specified by the source group. In the event that a group of target ports and/or directors are specified without a source pairing, the group of target ports specified may be used in further limiting the set of ports from which a random selection is made at steps 660 and 672. In the event that no port pairing can be made in accordance with the specified groupings (e.g., ports or directors are offline), an embodiment may generate an error message and/or take any one of a variety of actions. For example, an embodiment may terminate a distributed copying operation. Alternatively, an embodiment may make a selection in accordance with other visible ports if selection of a pairing can not be made in accordance with specified pairings and/or groupings.

It should be noted that in the event that the API does not specify any pairings or groupings, or specifies such information and the pairings and/or groupings all fail to be used as a preferred connection, a default set of ports and/or directors may be used to establish a connection.

Figure 14:
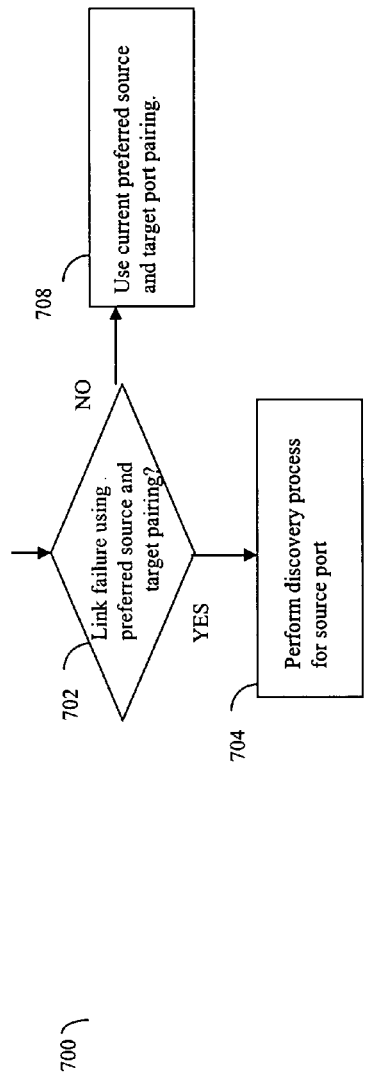
FIG. 14 is a flowchart of processing steps that may be performed by a director in connection with maintaining a path for use with the distributed copying technique.

Referring now to FIG. 14, shown is a flowchart 700 of processing steps that may be performed in an embodiment by a source director in connection with maintaining a path selection. The processing flowchart 700 may be performed, for example, when determining which particular path is to be used when copying portions of data for the distributed copying technique once a preferred source and target port pairing have been determined. At step 702, a determination is made as to whether a link failure is detected using the preferred source and target pairing. If not, control proceeds to step 708 to use the current preferred source and target pairing. Otherwise, if link failure has been determined at step 702, control proceeds to step 704 to perform the discovery process for the source port of the current pairing to determine a new target port. The discovery processing of 704 may include performing steps of flowchart 650 for use with the distributed copying technique.

In connection with a data pull operation where the controlling data storage system is the target performing flowchart 700 processing, step 704 performs the discovery process to determine an available source port for the current target port of the pairing.

The processing of flowchart 700 may be performed by a source director, for example, as subsequent portions of data are copied, or when a link failure has been detected due to a data transmission problem with a copying operation. In connection with making a port selection at step 704 after reperforming the discovery process, an embodiment may read previously stored information in connection with the current distributed copying technique from non-volatile storage. This information may include, for example, the particular group of target ports or target directors that may have been specified via the API for use in connection with a distributed copying technique. The discovery process performed at step 704 may determine a set of all target ports servicing a target device that are accessible from a source port. However, an API may further designate that only a subset of available ports may actually be used in connection with the distributed copying technique. In the event that a link failure is detected at step 702 causing the discovery process at step 704 to be re-executed, a director may access and re-read certain API specified parameters, such as the foregoing subset of target directors or ports included in the API designated for use with the distributed copying technique. Additionally, after discovery processing determines a source-target pairing, the pairing may also be stored to non-volatile storage for use in subsequent processing such as, for example, when copying another portion of data. The use of non-volatile storage to save and restore information is described elsewhere herein.

Figure 15:
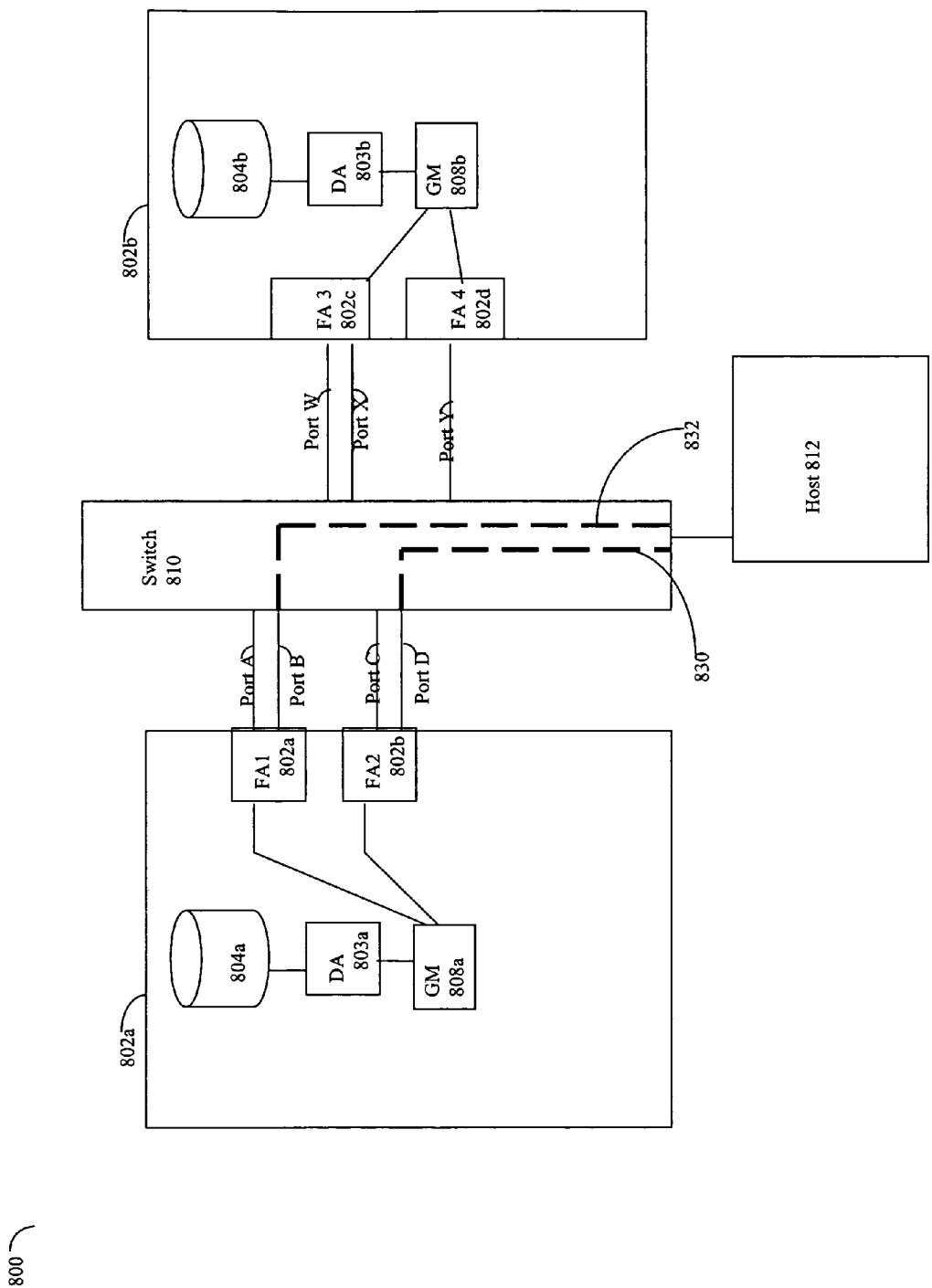
FIG. 15 is an example of a computer system used to illustrate the path determination techniques in connection with the distributed copying technique.

Referring now to FIG. 15, shown is an example 800 of a computer system used to illustrate the distributed copying techniques in conjunction with the API described herein for preferred path configuration. The example illustration 800 includes components similar to those as described elsewhere herein in connection with other figures. For the purposes of an example in connection with 800, the host 812 only communicates using the ports identified by dashed lines 830 and 832. Element 830 identifies a connection between the host 812 and port D of FA2. Element 832 identifies a path which the host 812 may use for communications between the host 812 and port B of FA1. In this example, the host 812 is not able to access or communicate with data storage system 802*a* using any ports other than Ports B and D. Port A and port C of data storage system 802*a* may communicate with data storage system 802*b* using any of ports W, X and Y. In other words, in connection with a distributed copying operation, port A may communicate with any one of ports W, X or Y. Similarly, port C may communicate with any of one ports W, X, or Y. In connection with the previously described discovery process, each of ports A and C may determine, through the discovery process, that each of ports W, X, and Y are accessible or visible from ports A and C. A user executing an application on a host 812 may know that the host 812 communicates only over connections to ports B and D as illustrated respectively by elements 832 and 830 of FIG. 15. The application executing on host 812 may use the foregoing API described herein in connection with configuring preferred path selection with a distributed copying operation. The devices of the data storage system 802*a* may be available and online such that the host 812 may issue read and write commands or operations to access devices in the data storage system 802*a* while the distributed copying operation is in progress, for example, copying data from the data storage system 802*a* to the data storage system 802*b*. Thus, 802*a* may be characterized as a source data storage system and data storage system 802*b* may be characterized as a target data storage system in connection with the distributed copying techniques. Prior to beginning the distributed copying operation, an application executing on host 812 may use one or more APIs, as described elsewhere herein, in connection with configuring the preferred path selection used for the distributed copying technique. Since the host 812 only uses ports B and D for communicating with the source data storage system 802*a*, such as for issuing I/O operations while the distributed copying technique is in progress, the API may be used for preferred path selection. In this example, the user may specify a mapping (via the application's API) taking into consideration the particular ports used by the host. The host may communicate with one of the FAs in 802*a* which initially receives the API. The FA receiving the FA communicates with the other FAs in the data storage system 802*a* to commence discovery processing for the distributed copying processing. As described elsewhere herein, each FA in 802*a* performs discovery for its own ports to determine corresponding pairings.

In an example with reference to FIG. 15, all target ports may be visible from each source ports. However, it may be desired to use and define a preferred mapping in accordance with the particular ports used for host communications so that Ports A and C of the source data storage system are mapped to port W of the target data storage system. These pairings of source and target port preferences to be used in connection with the preferred path selection of the distributed copying technique may be specified via an API as described elsewhere herein. Limiting the distributed copying to using only Ports A and C as just described may be specified using the API with preferred port mappings of Port A-Port W, and Port C-Port W. In the event that preferred pairings are unavailable, an embodiment may determine pairings use default sets of ports such as, for example, all visible ports.

In the event that one of the source or target ports designated in connection with the distributed copying technique becomes unavailable at a later point in time, such as, for example by a port or a director being offline, an embodiment may include code which is executed by a controlling director, such as one of the source directors FA1 and FA2, to select an alternate target port by the random selection technique from all visible target ports and/or in accordance with any specified portion of target ports designated for use with the distributed copying. However, as described herein in more detail, the preferred path selection as specified with the API may be used as long as the preferred path is accessible for data transmissions in connection with the distributed copying technique.

It should be noted that a single FA may be connected to, and may service, more than one device in a data storage system. Similarly, a single device may be connected to, and be serviced by, more than one FA.

In the example illustration of FIG. 15, an application executing on the host 812 may issue an API command to configure path selection for use in connection with a distributed copying operation. Subsequently, the distributed copying operation commences copying data from a device of the source data storage system to the target data storage system. While the distributed copying is in progress, the application executing on the host may issue an I/O operation, such as a write operation, to write new data to a device (such as 804*a*) in the source data storage system while the data from the device is being copied via the distributed copying operation.

The foregoing describes an application executing on a host in which one or more APIs may be used in connection with preferred path configuration for the distributed copying. A preferred path determination may be made using groupings (e.g., director-level and/or port-level), source-target mappings (e.g., director-level and/or port-level), and/or by random selection in connection with distributed copying. As will be appreciated by those of ordinary skill in the art, the path determination and selection techniques described herein may also be used in connection with other processing operations and tasks and is not limited to use in connection with the distributed copying processing. An application, for example, may utilize the one or more APIs of preferred path determination in connection with performing other processing operations.

The foregoing path determination may use a random selection of a port and/or director. An embodiment may use a random number generator in connection with the random selection processing. For example, an embodiment may use any one of a variety of pseudo-random number generators known in the art.

Use of the techniques described herein for preferred path specification in connection with the distributed copying technique, or other operation, can be used to improve the aggregate transfer speed of the operation by forcing each source port involved in the operation to use a different path. When an originally designated path preference encounters an error, a controlling director associated with a port of the path preference may recover from the error by finding an alternate path to the same target device.

In connection with the foregoing, each port may be associated with one or more logical unit numbers or LUNs. Each LUN may correspond to a particular logical or physical device such as, for example, an LV (logical volume) as described elsewhere herein.

Figure 16:
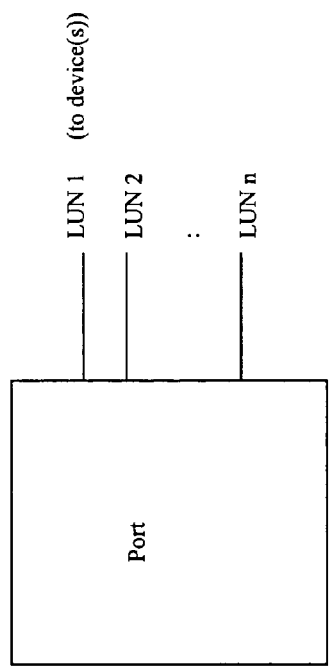
FIG. 16 is an example of an embodiment of a port and associated LUNs (logical unit numbers)

Referring now to FIG. 16, shown is an example 1000 of an embodiment illustrating a port in more detail and its associated LUNs. The example 1000 includes a port and LUNs. Each of the LUNs as indicated in the example 1000 may represent a connection to a device such as an LV which may be serviced by the port shown in the example 1000.

Figure 17:
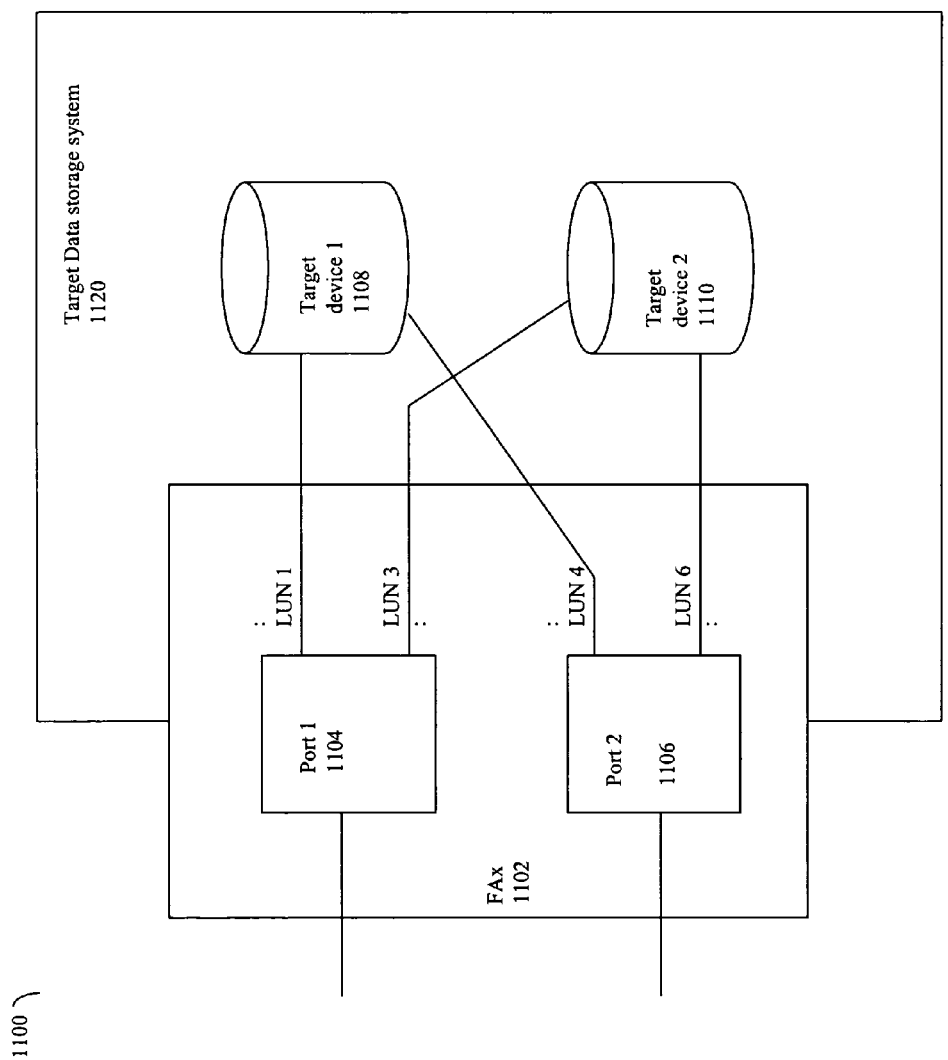
FIG. 17 is an example illustrating connections between LUNs and device in a data storage system.

Referring now to FIG. 17, shown is an example 1100 illustrating components of a director and associated ports with LUNs as may be included in a target data storage system. The example 1100 describes in more detail components of a single director, such as FAx 1102. The target data storage system 1120 may include more than one director. However, only a single director is shown for purposes of illustration. Within the director 1102, port 1 1104 and port 2 1106 may each have a number of LUNs. Each of the LUNs may be associated with a connection used to access a particular device. In the example 1100 of FIG. 17, each device may correspond to an LV. One or more LVs may reside on a physical device. LVs are described elsewhere herein in more detail. In this example 1100, port 1 1104 includes LUNs 1 and 3. Port 1 1104 may also include other LUNs than as illustrated in 1100. Port 2 1106 is shown as including LUNs 4 and 6. Similarly, port 2 1106 may include other LUNs than as shown in the example 1100. The logical mapping of port LUN numbers to target devices are shown for the sake of illustration in 1100. It should be noted that the example 1100 does not include any DAs, global memory, or other components that may be included in an embodiment of a data storage system. The connections of LUNs to particular devices as shown in 1000 represent a simplistic mapping of LUNs to devices for the sake of illustration. It should be noted that communications between devices, such as target devices 1108 and 1110, and ports are as described elsewhere herein even though components that may be used in communications have been omitted from 1100 for the purpose of illustration. In this example, LUN 1 of port 1 is mapped to a target device 1 1108. LUN 4 of port 2 also maps to the target device 1 1108. In this example, LUNs of multiple ports may be used in connection with servicing the same device as illustrated in 1100. Servicing the target device 2 1100 in this example is LUN 6 of port 2 and LUN 3 of port 1. Example 1100 includes target devices 1108 and 1110 as well as director 1102 as may be included in a target data storage system as described elsewhere herein. It should be noted that the source data storage system may similarly include directors having ports mapped to source devices using the LUNs as described and illustrated in connection with the target data storage system.

In one embodiment using a fiber channel network to facilitate communications between data storage systems and hosts connected thereto, each of the LUNs may has an associated worldwide unique name or WWN. Each WWN uniquely represents a particular device such as 1108 and 1110.

As described elsewhere herein, a discovery process may be performed in connection with a distributed copying technique in order to determine a preferred source/target pairing used as a preferred path. It should also be noted that as described herein the discovery process may also be performed as part of a service running as a process that may be used in connection with other techniques besides the distributed copying technique. In connection with performing a discovery process in one embodiment, a source/target pairing may be determined in accordance with the WWN specified for the source and/or target. For example, in one embodiment, the WWN may be specified for a target port in connection with the API described herein. Similarly, a WWN may be specified for a source port in connection with the API described herein. A user writing an application may designate via the API one or more sources and/or targets by specifying WWNs, for example, for LUN 1 of port 1 corresponding to target device 1 1108. In this embodiment, each port has its own unique WWN different from all other ports. Each LUN associated with a logical device has its own unique WWN. If two LUNs have the same WWN, they are considered as mapping to the same device, such as, for example, the same LV.

WWNs may be used in connection with processing steps described elsewhere herein such as, for example, FIG. 13 processing, when determining if a target port specified in a particular source-target port pairing has been found. As described above, if two LUNs have the same WWN, they are considered as mapping to the same device such as, for example, the same LV. Referring back to FIG. 17, LUN 1 of port 1 and LUN 4 of port 2 map to target device 1 1108. Each of the LUNs 1 and 4 have the same WWN referencing the device 1108. Each of the ports reside at a particular physical address associated with a port's WWN. It should be noted that the use of WWNs allows ports and other devices that reside at a particular physical address on the network to be physically relocated to a different physical address. If this occurs, the mapping of physical address to WWN may be updated such that use of the same WWN results in direction to the updated physical address on the network. Thus, references to the WWN may remain valid even though a particular physical address, for example such as the address of a particular port, has changed. The foregoing is one advantage of an embodiment that may use WWNs in connection with performing the techniques described herein. However, it should be noted that the techniques described herein are not limited to those embodiments using WWNs.

As described herein in connection with discovery processing, each source director having one or more ports performs a search for each port since each port may have varying connections. Thus, in connection with performing the discovery process in which the source data storage system is controlling the distributed copy operation, a walk may be performed for each source port to determine the path or paths in accordance with those remote ports which are accessible or reachable from that particular source port. Similar processing may be performed for a target port to determine accessible source ports when the target data storage system is controlling the distributed copying operation. WWNs may be used to specify ports.

Within a switching fabric that may be included in an embodiment is a name server referred to as the SNS (storage name server) name server. The SNS name server may be used in connection with implementing and using the WWNs as described herein. The SNS name server keeps track of which ports are active or connected to a network which may include one or more switches, and also keeps track of the particular physical address associated with each WWN. The switching fabric may be used in connection with facilitating communications between one or more data storage systems, and one or more hosts connected thereto, as described elsewhere herein. The one or more switches, for example, as illustrated in connection with previous figures may be part of a network, such as a storage area network or SAN used to facilitate communications between one or more data storage systems, hosts, and other devices connected thereto. When performing communications between data storage systems, for example, or between hosts connected thereto, reference may be made to the WWNs.

In connection with an embodiment that uses the fiber channel adapter, the fiber channel adapter may store on its associated data storage system a table which includes a list of ports on that particular fiber channel adapter. This table contains the physical port address of a particular fiber channel adapter or director and the particular WWN name associated with that port. When a port comes on line during its initialization processing, that port communicates to the SNS name server its WWN. Thus, the SNS name server may be used in tracking which ports having a WWN are currently active or may be used in connection with communications. Additionally, associated with each port is what may be referred to herein as a private LUN list. The private LUN list includes, for each port, the LUN number and associated WWN name. The LUN list may be stored on the data storage system associated with each port.

In one embodiment as described herein, SCSI commands may be used in connection with obtaining the necessary information used for performing a discovery process as related to WWNs. The SNS name server may be queried to return all of the WWNs of the active ports. Subsequently, a SCSI-based command may be issued to a data storage system to obtain the particular LUN numbers for each particular port. In other words, a single SCSI command in an embodiment may be issued for each port to return its LUN information. WWN information about a particular LUN of a port may also be obtained using a single SCSI command. For example, in order to determine the WWN associated with each of the LUNs of a port, a first command may be issued to obtain all of the active ports registered with the SNS name server. For one of the active ports, a SCSI command may be issued to obtain a list of LUN numbers for that particular port. Subsequently, a single SCSI command may be issued for each of the LUN numbers for that particular port in order to obtain the WWN for each LUN.

The foregoing discovery process, as well as other processing steps associated with the distributed copying technique, may be performed in an embodiment while also handling SCSI commands received from the host, such as, for example, in connection with I/O operations to access a device. As described elsewhere herein, the device used in connection with a distributed copying operation may also be available online for use in connection with host I/Os. As a result, an embodiment as described herein may implement a policy that data transmissions associated with the distributed copying technique commands may have a lesser priority than processing host I/O operations. Thus, processing of the distributed copying technique by a director may be interrupted to process a host command. In order to implement the foregoing, an embodiment may temporarily suspend, and subsequently resume, processing associated with the distributed copying technique in favor of executing pending host I/O commands. The discovery process of the distributed copying may be interrupted by a host I/O command received at a data storage system.

What will be described in following paragraphs is a technique for performing the discovery process in which the discovery process is able to resume based on saved discovery context or state information. Such data may be stored, for example, in memory and/or on nonvolatile storage. The discovery context which may be stored may include information such as, for example, remote devices discovered up to a particular point in processing when interruption occurs, which source port was in the process of having its associated remote ports discovered, and the like.

As will be described in following paragraphs, a tree may be used to represent the different levels of the network in connection with a discovery process at a particular point in time. This tree may represent a map of the remote ports discovered up to the point of interruption. Additionally, information describing a location in the tree may also be saved such that when the discovery process is resumed, processing may continue with the last element discovered on the same path, of the same port, and the like.

Figure 18:
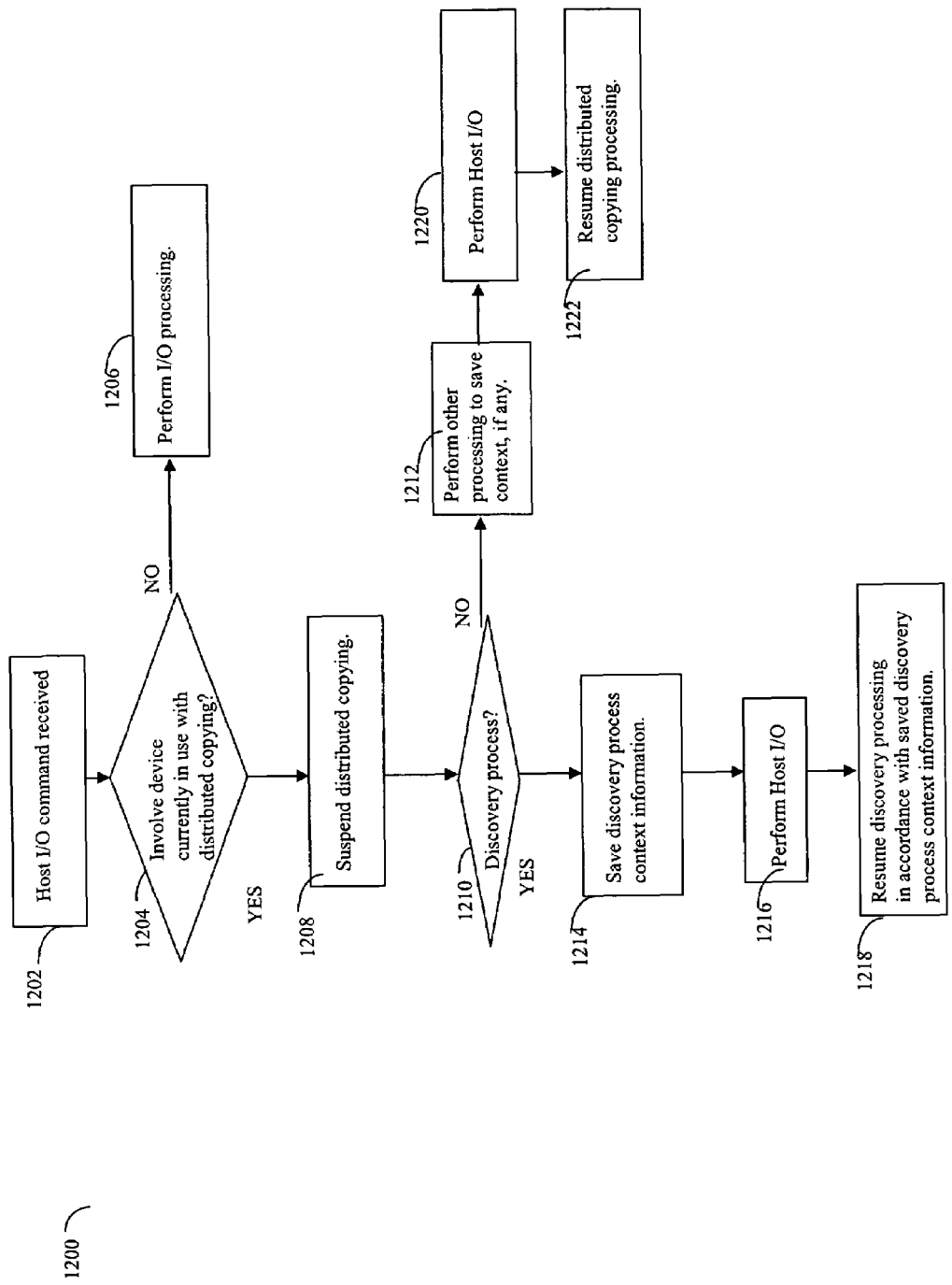
FIG. 18 is an example of a flowchart of processing steps that may be performed in an embodiment by a data storage system which may receive host I/Os while performing the distributed copying technique.

Referring now to FIG. 18, shown is a flowchart of processing steps that may be performed in an embodiment by a director processing both host I/O commands and commands in connection with performing the distributed copying technique. At step 1202, a host I/O command may be received by a director, for example, such as the fiber channel adapter of a source data storage system described herein. It should be noted that although step 1202 indicates that a host I/O command is received, any type of command or request may be received from a host or other entity connected to the data storage system performing the processing of flowchart 1200. The command received at step 1202 may be, for example, a command inquiring regarding status or other information. The command may be sent from another data storage system such as, for example, in connection with a multihop command. The multihop command is described, for example, in U.S. Pat. No. 6,697,367, issued Feb. 24, 2004, assigned to EMC Corporation, entitled MULTIHOP SYSTEM CALLS, which is incorporated by reference herein. At step 1204, a determination is made as to whether the device of the host I/O command is the same device currently in use by that particular director in connection with a distributed copying technique. If step 1204 evaluates to no, control proceeds to step 1206 to perform the host I/O processing. If step 1204 evaluates to yes indicating that processing associated with a distributed copying technique is being performed, control proceeds to step 1208 to suspend operation of the distributed copying technique. At step 1210, a determination is made as to whether discovery process is being performed. If not, control proceeds to step 1212 to perform other suspension processing, if any, that may be associated with other steps performed for the distributed copying technique. Subsequently, control may proceed to step 1220 to perform the requested host I/O. Completion of the host I/O results in control proceeding to step 1222 where the distributed copying processing that was previously suspended or interrupted is once again resumed. At step 1210, if the discovery process is being performed when a host I/O is received, control proceeds to step 1214 to save discovery process context information. Subsequently, control proceeds to step 1216 to perform the host I/O operation. After completing the host I/O operation, control may proceed to step 1218 to resume the discovery process in accordance with the saved discovery context information from step 1214.

Figure 19:
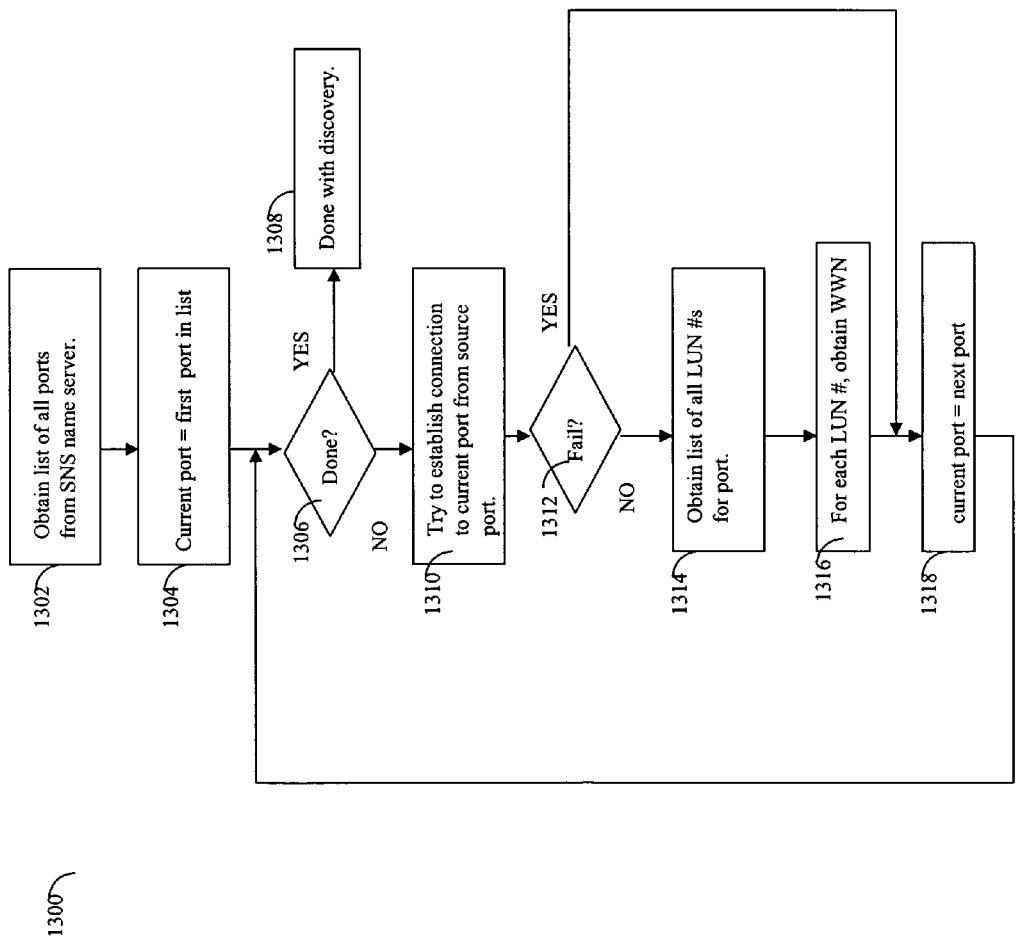
FIG. 19 is an example of a flowchart of processing steps that may be performed in an embodiment as part of discovery processing.

Referring now to FIG. 19, shown is a flowchart of processing steps of an embodiment that may be performed by a director when performing the discovery process for a particular source port. It should be noted that the steps of flowchart 1300 of FIG. 19 may be characterized as determining all ports which are reachable or available from a particular source port. As will be appreciated by one of ordinary skill in the art, the steps at flowchart 1300 may be modified to be used in connection with searching, for example, for a particular WWN port address as well as a particular LUN WWN address which will be described in more detail elsewhere herein in the following paragraphs. In connection with performing a complete discovery process wherein each of the available ports which are reachable from a particular source port are determined will now be described. At step 1302, a list of all ports which are currently on line may be obtained from the SNS name server. This is described elsewhere herein where the SNS name server may be queried to obtain a list of all of those ports and associated WWNs which are active. At step 1304, the current port is determined to be the first port on the list of active ports obtained from the SNS name server at step 1302. Control proceeds to step 1306 to determine if processing is complete for all of the currently active ports. If so, control proceeds to step 1308 where the discovery process stops. Otherwise, if step 1306 evaluates to no, control proceeds to step 1310 to try to establish a connection to the current port. At step 1312, a determination is made as to whether the attempt to establish a connection to the current port from a given source port has failed. If so, control proceeds to step 1318 where the current port is advanced to the next port. Processing continues at step 1306 with the next port in the list of active ports. If step 1312 evaluates to no, control proceeds to step 1314 to obtain a list of all LUNs for the current port. Step 1314 returns a list of the LUN numbers for the current port. Subsequently, control proceeds to step 1316 where one or more commands may be issued to obtain, for each LUN, the LUN's corresponding WWN. Control proceeds to step 1318 to advance to the next port in the list of currently active ports previously obtained from the SNS name server at step 1302.

In connection with the flowchart 1300, the information obtained about each of the ports explored may be stored, for example, in memory as well as nonvolatile storage. Thus, the steps of flowchart 1300 may be used in building a map of information representing the network as viewed from each port of each director when performing the discovery process. The information that may be produced while executing the steps of flowchart 1300 for each port may represent the view of remote ports and associated LUNs which are currently available or accessible from a particular source port or other local port of a director. The steps of flowchart 1300 of FIG. 19 may be performed by a director of a source data storage system for the director's associated source ports, for example, when determining a preferred source-target port pairing for use in connection with a distributed copying operation.

The steps of flowchart 1300 as included in FIG. 19 may represent walking a complete list of available ports as may be reached, for example, from a current source port. As described elsewhere herein, the processing may also be performed in connection with a discovery process where the discovery process may terminate when searching for a particular target port or target director. When searching for a particular port such as may be specified using a port-level mapping or grouping, for example, the processing of flowchart 1300 may terminate when step 1316 results in obtaining the WWN of a particular port servicing a target device. In other words, the WWN of the port matches a specified port, and the WWN of a LUN of that port matches a specified target device. Similarly, when searching for a particular director, the processing of flowchart 1300 may terminate when a port of that particular director has a LUN with a WWN of a target device. The particular director of a port may be determined using any one of a variety of different techniques that may vary with an embodiment. For example, the target ports associated with each target director may obtained by a source director from configuration information of the target data storage system. The source director may obtain the configuration information prior to performing discovery. The configuration information of the remote target data storage system may be stored, for example, along with other information used in the distributed copying operation on a form of nonvolatile storage. Such other information may include, for example, the data structure described elsewhere herein in connection with FIG. 20.

Figure 20:
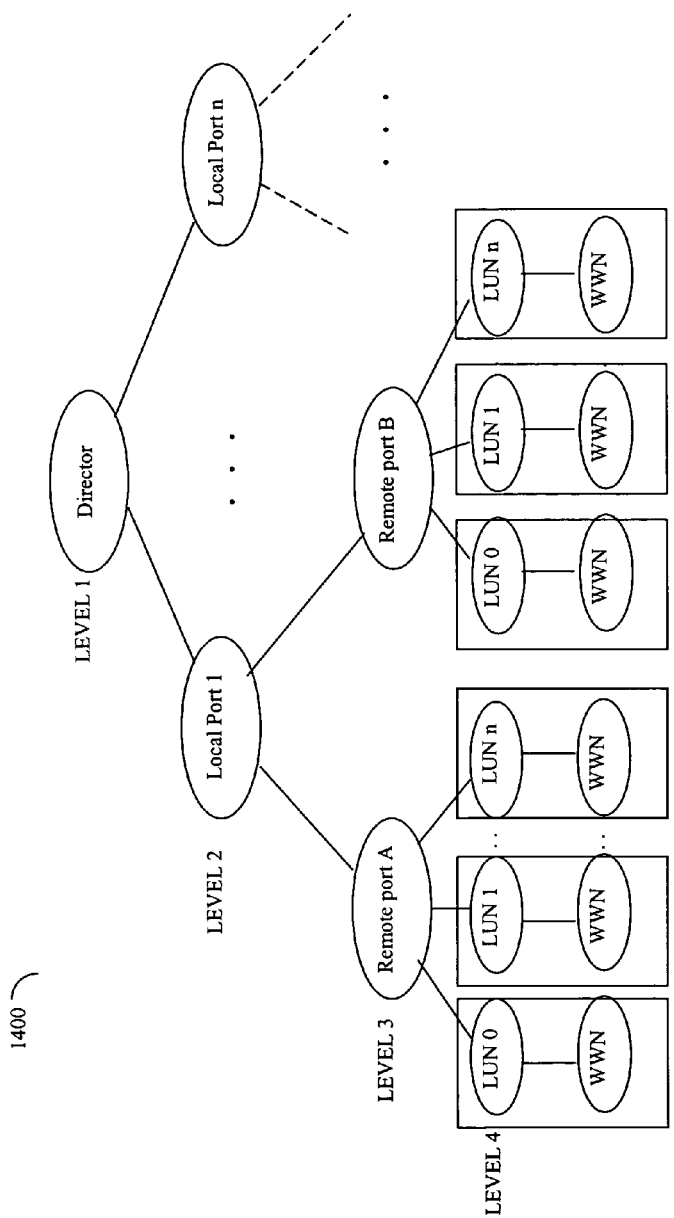
FIG. 20 is an example representation of a data structure that may represent discovery information for a director.

Referring now to FIG. 20, shown is an example of an embodiment of a data structure representing a tree that may be used to store the information obtained during the discovery process. The illustration of FIG. 20 represents a tree including 4 levels of information. During the discovery process as described, for example, in connection with FIG. 19, the processing may be characterized as building the tree illustrated in FIG. 20 in a depth-first manner. The tree 1400 may store data for a particular director, for example, such as a fiber channel adapter of a source data storage system performing the discovery process. The first level includes a node corresponding to a particular director. The second level includes a node corresponding to each local port of the director identified by the level 1 node (or root of the tree). The third level includes an identifier for each remote port for which a connection can be established from each local port specified at the second level. For example, illustrated in 1400 is local port 1 at level 2, having two child nodes, remote port A and remote port B, at level 3. This represents that remote port A and remote port B are reachable from local port 1. Each of remote port A and remote port B are associated with a child node at level 4 that includes port LUN information. For example, associated with remote port A are LUNs 0, 1, . . . , and N. This illustration represents that remote port A has LUNs 0, 1, . . . , and N. Associated with each LUN number node at level 4 is a WWN for that LUN of the remote port.

Figure 21:
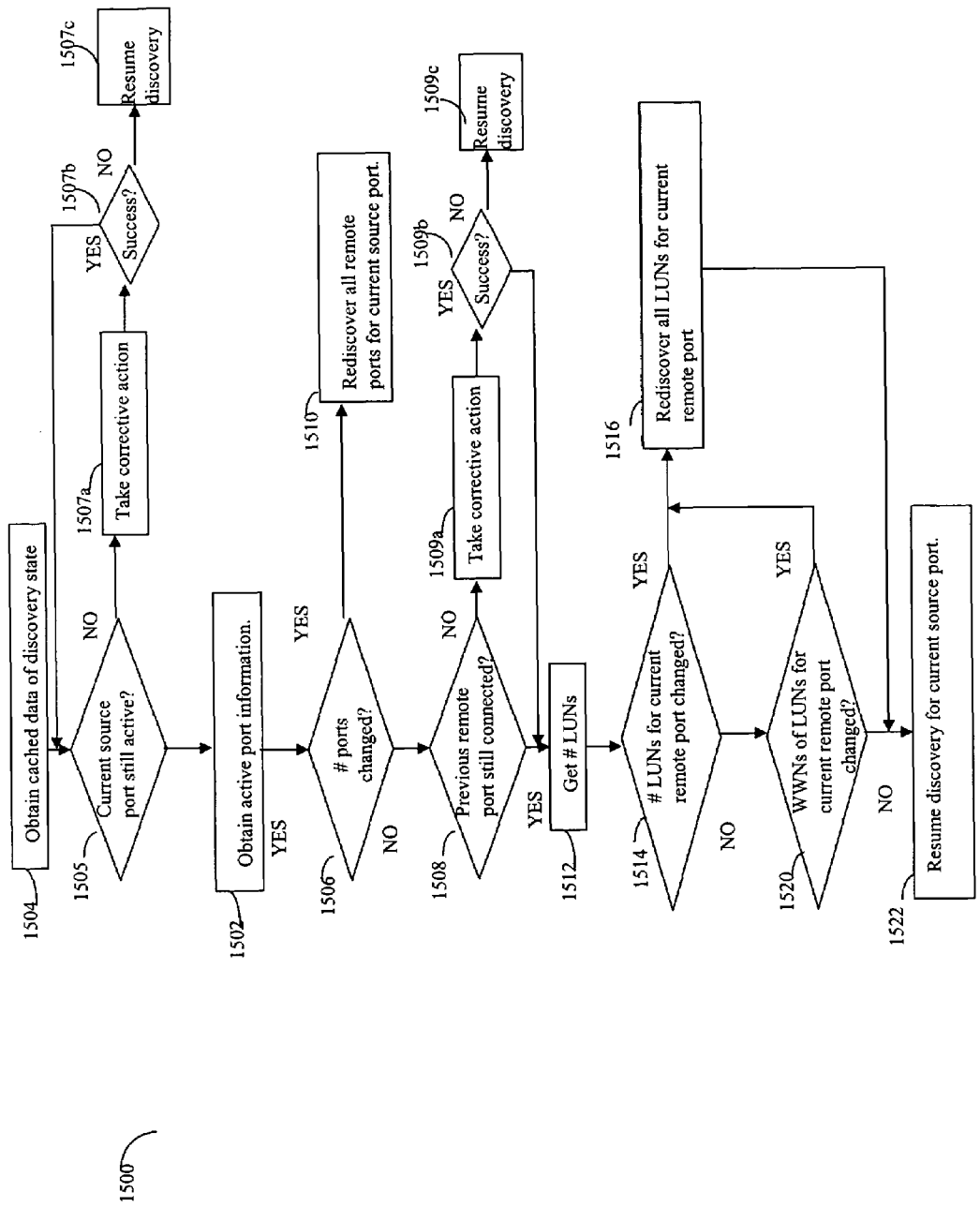
FIG. 21 is a flowchart of processing steps that may be performed in an embodiment when resuming discovery processing that was previously suspended.

Referring now to FIG. 21, shown is a flowchart of steps that may be performed in an embodiment when resuming discovery processing which may have been suspended or otherwise interrupted. Flowchart 1500 of FIG. 21 describes, for example, step 1218 of FIG. 18 in more detail. The steps of flowchart 1500 may be performed by a director, for example, such as a fiber channel adapter described herein, when resuming discovery processing. With reference to FIG. 20, level 2 nodes are characterized as local ports for which the discovery processing is being performed to determine connections to remote ports as indicated as level 3 nodes. In the example described herein, the local port may refer to those ports of the director performing the steps of flowchart 1500. In this example, the local port is a source port servicing the source device in which the source data storage system is controlling the distributed copying. In another example in which the target data storage system is controlling the distributed copy operation, the local port may be referred to as a target port which services the target device and which is a port of the target director executing the steps of flowchart 1500. The remote ports in the example in following paragraphs (source data storage system controlling the distributed copying) may be characterized as those ports not included in the current director performing the steps of 1500 which are accessible from the current source port. The discovery process, as performed by a source director on the source data storage system, was previously interrupted while discovering all paths from a source port servicing a source device.

At step 1504, the previously cached or saved discovery state information is obtained. In following steps, the previously cached information identifies a current source director, a current source port of the current source director, and a current remote port representing the point in discovery processing at which suspension occurred and is now being resumed. Subsequent processing steps attempt to assess changes that may have occurred in the system, as may affect resuming discovery processing. It should be noted that the following illustrates certain characteristics representing the state of discovery that may be examined in this assessment. However, an embodiment may also use a different set of characteristics than as described herein in performing this assessment.

At step 1505, a determination is made as to whether the current source port is still active. If step 1505 evaluates to no, control proceeds to step 1507a where a corrective action is taken to the current source port. The particular steps of 1507a may vary with each embodiment in an attempt to try and bring the source port back as an active port for use with the techniques described herein. At step 1507b, a determination is made as to whether the corrective action is successful. If so, control proceeds to step 1505. Otherwise, control proceeds to step 1507c where discovery is resumed for the remaining source ports of the current director. Any cached information for the current source port may be discarded. With reference to FIG. 21 in one embodiment, this discarding of information may include all current information in the tree structure representation for a level 2 node corresponding to the current source port. If step 1505 evaluates to yes, control proceeds to step 1502. At step 1502, active port information is obtained. The active port information at step 1502 may be obtained by querying the SNS name server for port information. As described elsewhere herein, the SNS name server tracks those ports which are currently active. The SNS name server also stores a WWN for each active port.

At step 1506, a determination is made as to whether the number of active ports has changed. At step 1506, the current number of active ports obtained at step 1502 may be compared to the number of active ports as included in the previously cached discovery state information. If the number of ports has changed as determined at step 1506, control proceeds to step 1510 to rediscover all remote ports which are accessible from the current source port. Otherwise, if step 1506 evaluates to no indicating that the number of ports has not changed, control proceeds to step 1508. Step 1508 determines whether the current remote port, having a node at level 3 of 1400, of the current source port, having a node at level 2 of 1400, is still connected to the current source port. If not, control proceeds to step 1509a where a corrective may be taken to repair the connection. At step 1509b, a determination is made as to whether the corrective action is successful. If so, control proceeds to step 1512. Otherwise, control proceeds to step 1509c to resume discovery with the next remote port.

If step 1508 evaluates to yes indicating that the current remote port is still connected in accordance with the active port information obtained in step 1502, control proceeds to step 1512 to obtain the number of current LUNs for the current remote port. Step 514 determines if the number of LUNs for the current remote port has changed. The determination at step 1514 may be performed by comparing the previously cached number of LUNs for the current remote port to the current number of LUNs as obtained at step 1512. If step 1514 determines that the number of LUNs for the current remote port has changed, control proceeds to step 1516 to rediscover all LUNs on the current remote port (e.g., rediscover level 4 information for the level 3 node corresponding to the current remote port). If step 1514 evaluates to no indicating that the number of LUNs for the current remote port has not changed, control proceeds to step 1520 to determine if any of the WWN's of the LUNS for the current remote port has changed. If step 1520 evaluates to yes indicating that there has been a change with respect to a WWN for LUN, control proceeds to step 1516. Otherwise, control proceed to step 1522 to resume discovery for the current source port.

It should be noted that an embodiment may implement step 1520 using any one or more different techniques that may vary with each embodiment. In one embodiment, the director or FA performing the discovery processing may perform a status check by sending a message to a remote data storage system, or a director or other component therein. The message may be an inquiry message as to whether there have been any changes made since a specified time. The changes may have been reported to the director performing steps of 1500 by the particular component at the time a change was actually made. This may have been, for example, while the current source director was in the state of suspension. An embodiment may use a combination of the foregoing, or other techniques.

Referring back to step 1208 of FIG. 18 where distributed copying is suspended, it should be noted that an embodiment may determine that the distributed copying and its associated phases or steps may be suspended at different points in time. For example, if the distributed copying processing is performing the discovery process, an embodiment may suspend the discovery process after completing discovery for a remote port. In other words, when suspending processing of a distributed copying technique, the data structure 1400 of FIG. 20 is left in a state such that, when the discovery process is resumed, the discovery process may properly continue. In one embodiment, suspension of the discovery process may leave the data structure 1400 in a state such that if properly suspended, such as in connection with flowchart 1200 processing of FIG. 18, each remote port at level 3 may have nodes at level 4 for all LUNs or no LUNs. Each node at level 4 may or may not have an associated WWN at the time of suspension.

In the event that distributed copying processing is suspended in connection with FIG. 18 steps and the distributed copying processing was transmitting data in accordance with, for example, the second phase as described elsewhere herein, a data storage system may choose to suspend processing at a particular point in time so that the data transmission may be resumed for the particular portion or chunk of data. It should be noted that other embodiments may vary those points at which distributed copying processing may be suspended than as described herein.

Figure 22:
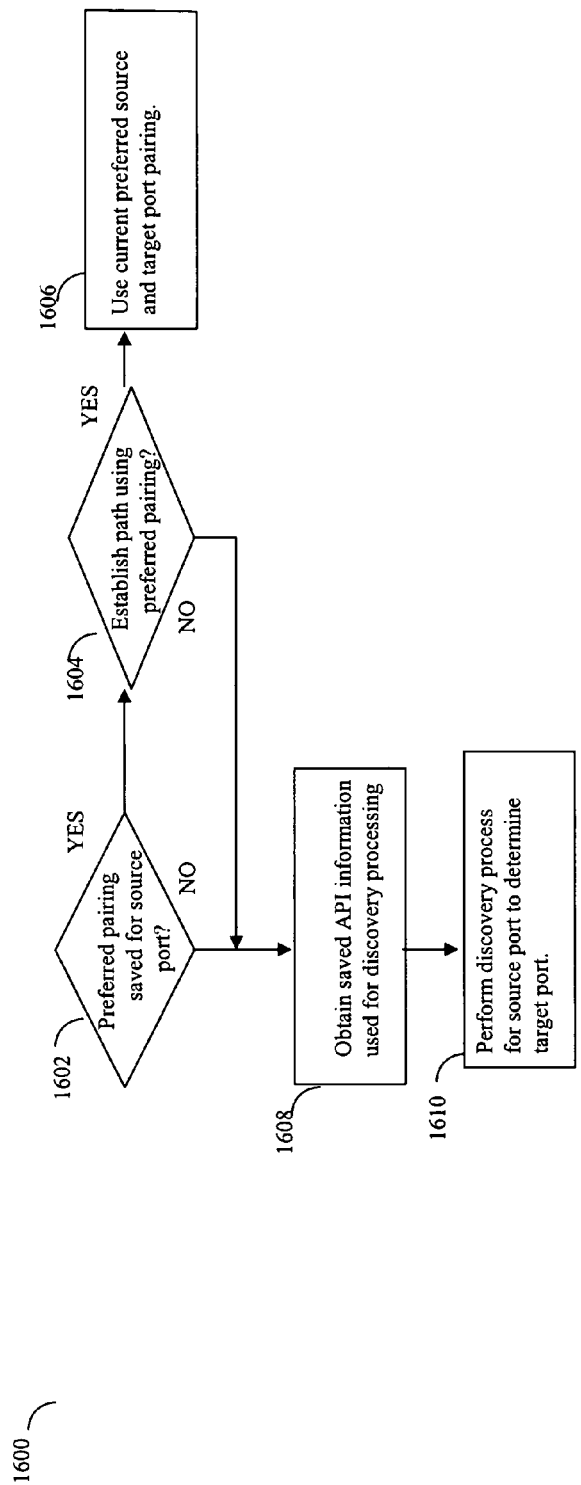
FIG. 22 is a flowchart of processing steps that may be performed in an embodiment when re-establishing a path for use in data transmission with the distributed copying technique.

Referring now to FIG. 22, shown is a flowchart 1600 of processing steps that may be performed in an embodiment by a director when attempting to reestablish a connection defined by a preferred pairing. The steps of 1600 may be performed, for example, when an existing path or established link, as defined by a preferred source-target pair, experiences data transmission problems. At step 1602, a determination is made as to whether a preferred pairing is saved for a current source port of the director performing the processing of flowchart 1600. The preferred pairing may be obtained, for example, from nonvolatile storage as may have been previously saved. If a preferred pairing is found for the current source port, control proceeds to step 1604 where a determination is made as to whether a path may be established using this preferred pairing. If so, control proceeds to step 1606 to use the current preferred source and target port pairing and its established connection. Otherwise, if step 1604 evaluates to no indicating that a path is not able to be established for the preferred pairing, control proceeds to step 1608 to determine another preferred pairing. At step 1608, saved API information may be obtained, for example, from nonvolatile storage. The API information, and other saved information, may be used for the discovery process to be performed in subsequent steps of flowchart 1600. At step 1610, the discovery process is performed for the source port of the director executing the steps of flowchart 1600 to determine a new target port. The discovery process performed may include performing the steps of flowchart 650. As part of 1610, the new preferred pairing may also be saved in nonvolatile storage. This new preferred pairing may be used in the event that steps of flowchart 1600 are again executed for the same current port, for example, if there is a subsequent data transmission problem with the link established for the new preferred pairing.

Figure 23:
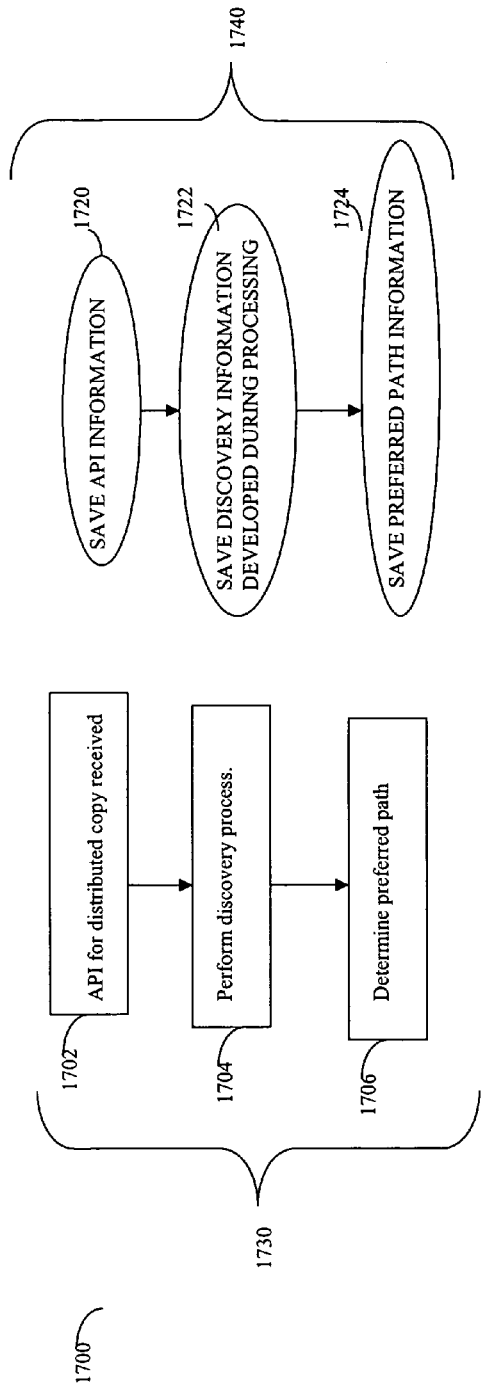
FIG. 23 is an example representing distributed copying processing steps and associated actions taken to save information that may be used in subsequent processing steps for discovery and re-establishing preferred paths for data transmission.

Referring now to FIG. 23, shown is a flowchart 1700 of distributed copying processing steps and associated operations in connection with discovery context state information and API information that may be performed in an embodiment by a director. Element 1730 represents high level processing steps that may be performed in connection with a distributed copying technique as described elsewhere herein in more detail. Element 1740 represents those operations that may be performed in connection with discovery context information and other data that may be saved, for example, to nonvolatile storage and used in connection with other processing steps described herein. At step 1702, the API for the distributed copy is received, for example, at a data storage system. In response to receiving this API, the data storage system may in turn save API information, for example, to nonvolatile storage. The API information may include, for example, any preferred source target pairings, groupings, or other information as described herein that may be specified via the API. At step 1704, discovery processing may be performed. Discovery information may be saved representing the paths and connections explored from the first port (e.g., a source port when a source director is performing the discovery and preferred path determination) up to a current processing point. The discovery information that may be saved, for example, to nonvolatile storage may include the data structure being constructed such as 1400 of FIG. 20. Associated with this data structure may be a pointer or other descriptor into the data structure representing the particular node (such as which particular level 2 and 3 nodes) for which discovery processing is being performed. Other state information stored in a discovery context may include the number of active ports as obtained, for example, from the SNS name server indicating those ports which are currently active or connected. If discovery processing is suspended, the saved information of the tree structure represents the discovery information determined up to the point of suspension. This information, as well as other information, may be used when resuming discovery processing.

At step 1706, a preferred path is determined after discovery processing has completed in accordance with the discovery information saved, for example, in connection with 1722. After the preferred path as indicated by a source-target port pairing has been determined, preferred path information may be saved, for example, to nonvolatile storage. This preferred path information may be used, for example, in connection with processing described elsewhere herein in the event that a data transmission is interrupted or otherwise suspended (e.g., data transmission error, suspension due to higher priority operation such as a host I/O). When attempting to resume data transmission for a source port, if the source port is included in a saved preferred path, an embodiment may first attempt to reestablish a connection using that preferred path. If such reestablishment is not successful, the discovery process may be reperformed to determine a new preferred path including the source port.

Figure 24:
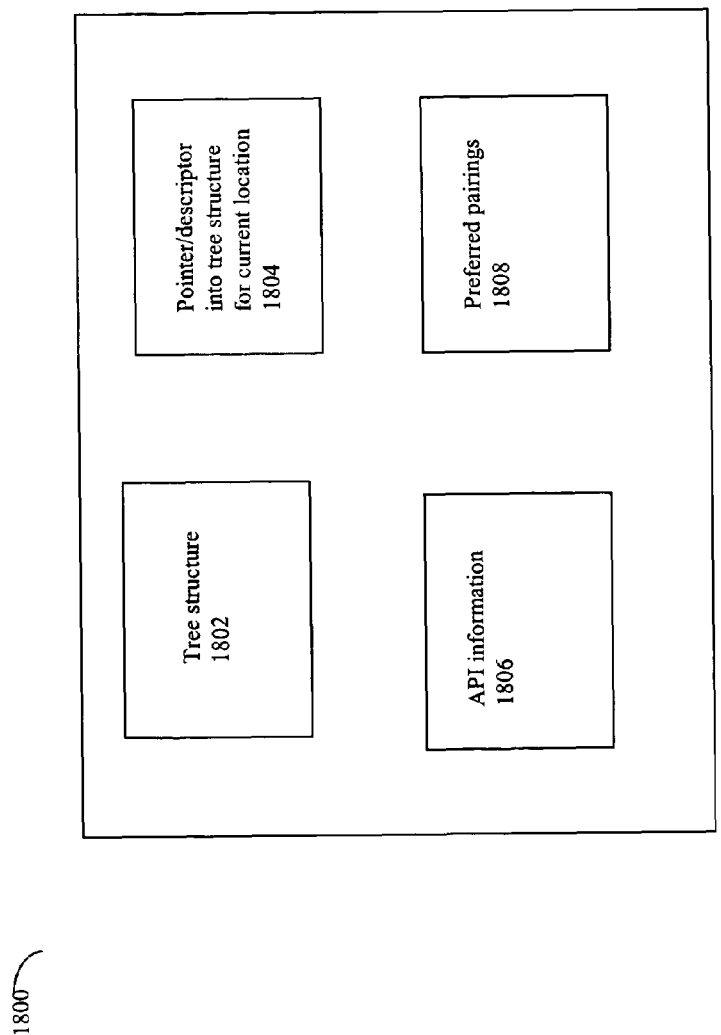
FIG. 24 is an example representation of information that may be cached in connection with a distributed copying operation.

Referring now to FIG. 24, shown is a representation 1800 of information that may be saved or cached in connection with the distributed copying operation described herein. The information in 1800 may be restored and used in connection with processing steps as described elsewhere herein. The information of 1800 may be stored in a non-volatile storage device. The representation 1800 includes a tree structure 1802, a pointer or descriptor 1804 into the tree structure, API information 1806, and preferred pairings 1808. It should be noted that other embodiments may save and restore different information than as illustrated in 1800. An embodiment may also include different information in connection with representing the current discovery state. The tree structure 1802 represents the ports discovered to a current point in processing. The structure 1802 may be, for example, a snapshot of the structure described in connection with FIG. 20. The element 1804 identifies a location in the structure 1802. In one embodiment, this may be a descriptor indicating a current location in the tree, for example, representing a point in discovery processing. The element 1804 may be used in connection with resuming suspended discovery processing. The API information 1806 may include information specified in the API call such as, for example, preferred pairings, groups of ports or directors, and the like. The API information 1806 may be used, for example, in connection with reperforming discovery processing if a link fails. The preferred pairings 1808 may be used, for example, in connection with attempting to retry data transmissions on a previously failed path, resuming suspended or interrupted data transmissions, and the like.

In one embodiment, the tree structure 1802 may be represented using the following:
- a count representing the number of level 3 nodes
- a changed level 3 boolean
- a count representing the number of level 4 nodes
- a changed level 4 boolean.

The level 3 boolean may be a boolean value set to TRUE when there has been a change to the level 3 information in the tree while a director is in a suspended state. Similarly, level 4 boolean may be set if there has been a change to the level 4 information in the tree while a director is in a suspended state. Setting level 3 and level 4 booleans may be performed by another process maintaining and/or monitoring the state of the system. The level 4 boolean may change, for example, if there is a change to the WWN of a LUN or the number of LUNs. This may be determined, for example, when a message is received reporting on such changes from a remote data storage system while a director has suspended discovery processing. The level 3 boolean may be changed, for example, is a new port comes on line, an existing port is removed, and the like, while a director has suspended discovery processing and the state information of 1800 represents this information. One embodiment may obtain each WWN of a LUN for each LUN. After each WWN for each LUN is obtained, a determination may be made as to whether this LUN's WWN matches the target device. By testing each LUN to see if its WWN matches the target device as each LUN's WWN is obtained, the state of the discovery process may be maintained as described above. If it is determined that the LUN's WWN does not match, processing continues. In the event that discovery processing is then suspended, there is no need to know actual WWNs of remote ports, LUNs and the like, that have previously been mismatches in accordance with specified criteria (e.g., port WWN, LUN WWN) for the discovery processing. Discovery processing may resume with the next port, LUN, and the like that has not yet been compared to the specified discovery criteria.

In connection with performing discovery processing and storing information in a representation, for example, such as illustrated in FIG. 20, an embodiment may perform discovery processing for only those remote ports which are included in the target data storage system. For example, if performing discovery processing for a source port such as FA1 of FIG. 11, the data representing the discovered ports visible from the source port may include only those remote ports of data storage system 502b which are accessible from the source port and which service the target device.

The foregoing describes a technique that may be used in an embodiment in connection with the distributed copying operation. A director, such as of a source data storage system controlling the distributed copying operation, may receive commands from a host while also performing processing in connection with the distributed copying. In one embodiment, the distributed copying processing may have a lesser priority than host I/O commands. Thus, a director performing distributed copying processing may suspend the processing to handle host I/O commands. In connection with this suspension that may occur during the discovery process, the foregoing describes techniques enabling suspension and resumption of the discovery process and subsequent path determination processing in favor of executing host commands. In connection with the discovery process, suspension may include saving discovery context or state information in order to resume at a later point. The foregoing describes an embodiment using a tree structure representing a map of ports currently discovered. Additionally, a multi-level descriptor representing a current location in the tree may be saved so that when discovery processing is resumed, processing may attempt to continue at the point at which suspension occurred.

It should be noted that as described herein, a host may issue an API call to specify preferred mappings (port-level and/or director-level), and/or groupings (port level and/or director-level). As known to those of ordinary skill in the art, the API may include, for example, specifying one or more parameters in an API call from an application.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing operations in a data storage system comprising:
   receiving, by a director, a request from an entity connected to the data storage system;
   determining whether said request utilizes a same device currently in use with a distributed copy operation; and
   performing processing if it is determined that said request uses a same device as currently in use with said distributed copy operation, said processing including:
   a) suspending said distributed copy operation;
   b) determining if said director is performing discovery processing associated with said distributed copy operation for copying data between said data storage system and another data storage system; and
   c) if said director is performing said discovery processing, suspending said discovery processing to perform said request, wherein said suspending includes saving discovery context information describing a state of said discovery processing, said discovery processing determining one or more paths between said data storage system and the other data storage system for use in connection with said distributed copying operation.

2. The method of claim 1, further comprising:
   resuming said discovery processing in accordance with said discovery context information.

3. The method of claim 2, wherein said discovery context information includes a representation of those paths discovered when said suspending occurs.

4. The method of claim 3, wherein said representation is a tree structure that includes port-level discovery information.

5. The method of claim 4, wherein said tree includes 4 levels of nodes, a first level including a root node corresponding to a director, a second level including a node for each local port of said director, a third level including a node for each remote port accessible from one of said local ports, a fourth level including a node for each logical unit associated with a remote port having a node at said third level and a name associated with said each logical unit, said tree being constructed in a depth-first manner in accordance with performing said discovery processing.

6. The method of claim 5, wherein said discovery context information includes a descriptor representing a location in said tree structure at which said resuming attempts to continue with discovery processing.

7. The method of claim 3, further comprising, for said distributed copying operation, saving information regarding said one or more paths, said one or more paths being used in data transmissions for said distributed copying operation.

8. The method of claim 1, wherein said request is a request to perform an I/O operation associated with a device being serviced by said director.

9. The method of claim 8, wherein said device is one of a source device or a target device for which said distributed copy operation is being performed.

10. The method of claim 1, wherein said entity is a host, and said request is a data request.

11. A data storage system comprising:
    a director which receives a request from an entity connected to the data storage system;
    code that determines whether said request utilizes a same device currently in use with a distributed copy operation; and
    code that performs processing if it is determined that said request uses a same device as currently in use with said distributed copy operation, said code that performs processing including code that:
    a) suspends said distributed copy operation;
    b) determines if said director is performing discovery processing associated with said distributed copy operation for copying data between said data storage system and another data storage system; and
    c) if said director is performing said discovery processing, suspends said discovery processing to perform said request, wherein suspending said discovery processing includes saving discovery context information describing a state of said discovery processing, said discovery processing determining one or more paths between said data storage system and the other data storage system for use in connection with said distributed copying operation.

12. The data storage system of claim 11, wherein said request is a request to perform an I/O operation associated with a device being serviced by said director.

13. The data storage system of claim 12, wherein said device is one of a source device or a target device for which said distributed copy operation is being performed.

14. The data storage system of claim 11, wherein said entity is a host, and said request is a data request.

15. A method of performing discovery processing of a director of a data storage system comprising:
    determining one or more local ports of said director; and
    determining all accessible remote ports for each of said one or more local ports of a director, wherein state information is stored representing a state of said discovery processing at a point in time to enable resuming said discovery processing if said discovery processing is interrupted, and wherein, when said director receives a request from an entity and a device specified in said request is currently in use by said director in connection with a distributed copy operation and said director is performing discovery processing, said distributed copy operation is suspended and said discovery processing is interrupted in order to process said request.

16. The method of claim 15, wherein said discovery processing is performed by a director of a data storage system, said director including said one or more local ports.

17. The method of claim 15, wherein said discovery processing is performed as part of processing for said distributed copy operation.

18. The method of claim 17, wherein said request is an I/O operation which includes accessing data on a device serviced by said director.

19. The method of claim 15, wherein said state information is stored on a non-volatile storage device.

20. The method of claim 15, wherein said entity is a host, and said request is a data request.

* * * * *

UNITED STATES PATENT AND TRADEMARK OFFICE
CERTIFICATE OF CORRECTION

PATENT NO.       : 7,634,595 B1                                   Page 1 of 1
APPLICATION NO. : 11/014597
DATED            : December 15, 2009
INVENTOR(S)      : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Ninth Day of November, 2010

David J. Kappos
*Director of the United States Patent and Trademark Office*